United States Patent [19]

Yoshioka et al.

[11] Patent Number: 6,038,661
[45] Date of Patent: *Mar. 14, 2000

[54] SINGLE-CHIP DATA PROCESSOR HANDLING SYNCHRONOUS AND ASYNCHRONOUS EXCEPTIONS BY BRANCHING FROM A FIRST EXCEPTION HANDLER TO A SECOND EXCEPTION HANDLER

[75] Inventors: Shinichi Yoshioka; Ikuya Kawasaki; Shigezumi Matsui, all of Kodaira; Susumu Narita, Kokubunji, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/524,712

[22] Filed: Sep. 7, 1995

[30] Foreign Application Priority Data

| Sep. 9, 1994 | [JP] | Japan | 6-241991 |
| Mar. 17, 1995 | [JP] | Japan | 7-086067 |
| Aug. 25, 1995 | [JP] | Japan | 7-240872 |

[51] Int. Cl.[7] .................................................. G06F 9/30
[52] U.S. Cl. ............................................ 712/244; 710/269
[58] Field of Search .................................. 395/800, 733, 395/742, 591, 800.01, 800.02, 800.32, 734; 364/230.2, 263.2, 280.8; 711/200; 710/260–269; 712/244, 32

[56] References Cited

U.S. PATENT DOCUMENTS

| 4,768,149 | 8/1988 | Konopik et al. | 395/867 |
| 5,109,329 | 4/1992 | Strelioff | 395/734 |
| 5,155,853 | 10/1992 | Mitsuhira et al. | 395/734 |
| 5,214,793 | 5/1993 | Conway et al. | 455/500 |
| 5,349,667 | 9/1994 | Kaneko | 395/740 |
| 5,386,563 | 1/1995 | Thomas | 395/800 |
| 5,448,705 | 9/1995 | Nguyen et al. | 395/591 |
| 5,450,560 | 9/1995 | Bridges et al. | 711/200 |
| 5,481,685 | 1/1996 | Nguyen et al. | 395/591 |
| 5,557,764 | 9/1996 | Stewart et al. | 395/200.05 |
| 5,574,872 | 11/1996 | Rotern et al. | 395/376 |
| 5,634,130 | 5/1997 | Lee | 395/733 |

OTHER PUBLICATIONS

Microcomputer Handbook, Edited by Shigeru Watanabe, et al., pp. 177–178.

*Primary Examiner*—John A. Follansbee
*Attorney, Agent, or Firm*—Loudermilk & Associates

[57] ABSTRACT

A vector point of an exception handler related to TLB miss exception events is obtained by reading a vector base address of a register VBR one time, and by adding a vector offset (H'400) thereto. A vector point of an exception handler related to exception events other than the TLB miss exception events is obtained by adding a vector offset to a value (vector base address) of the register VBR, and an exception code which is an address offset obtained by reading a value of the register EXPEVT or INTEVT one time is added to the vector point that is obtained. Thus, the processing is branched to a required exception handler to execute the exception event processing related to exception events other than the TLB miss exception events.

15 Claims, 14 Drawing Sheets

FIG. 3

GENERAL PURPOSE REGISTERS

| 31 | 0 |
|---|---|
| R0(BANK0)/R0(BANK1) ||
| R1(BANK0)/R1(BANK1) ||
| R2(BANK0)/R2(BANK1) ||
| R3(BANK0)/R3(BANK1) ||
| R4(BANK0)/R4(BANK1) ||
| R5(BANK0)/R5(BANK1) ||
| R6(BANK0)/R6(BANK1) ||
| R7(BANK0)/R7(BANK1) ||
| R8 ||
| R9 ||
| R10 ||
| R11 ||
| R12 ||
| R13 ||
| R14 ||
| R15 ||

USER MODE → THE REGISTERS OF BANK(0) CAN BE
            USED AS GENERAL PURPOSE REGISTERS
PRIVILEGED MODE
  SR,RB=1→ THE REGISTERS OF BANK(1) CAN BE
           USED AS GENERAL PURPOSE REGISTERS
  SR,RB=0→ THE REGISTERS OF BANK(0) CAN BE
           USED AS GENERAL PURPOSE REGISTERS

SYSTEM REGISTERS

| 31 | 0 |
|---|---|
| MACH ||
| MACL ||

Multiply and Accumulate High and Low
registers(MACH/L)
Store the results of multiplication and
accumulation operations

| 31 | 0 |
|---|---|
| PR ||

Procedure Register(PR)
Stores the return address for exiting
subroutine procedures

| 31 | 0 |
|---|---|
| PC ||

Program Counter(PC)
Indicates the starting address of the current
instruction incremented by four

FIG. 5

PRIVILEGED MODE

SR, RB = 0 → THE REGISTERS OF BANK(0) CAN BE USED AS GENERAL PURPOSE REGISTERS

SR, RB = 1 → THE REGISTERS OF BANK(1) CAN BE USED AS GENERAL PURPOSE REGISTERS

| 31 0 |
|---|
| R0 (BANK0)/R0 (BANK1) |
| R1 (BANK0)/R1 (BANK1) |
| R2 (BANK0)/R2 (BANK1) |
| R3 (BANK0)/R3 (BANK1) |
| R4 (BANK0)/R4 (BANK1) |
| R5 (BANK0)/R5 (BANK1) |
| R6 (BANK0)/R6 (BANK1) |
| R7 (BANK0)/R7 (BANK1) |
| R8 |
| R9 |
| R10 |
| R11 |
| R12 |
| R13 |
| R14 |
| R15 |

| SR |
|---|
| SSR |

| GBR |
|---|
| MACH |
| MACL |
| VBR |
| PR |

| PC |
|---|
| SPC |

SR, RB = 0 → THE REGISTERS OF BANK(1) ARE ONLY ACCESSED BY THE LDC/STC INSTRUCTIONS

SR, RB = 1 → THE REGISTERS OF BANK(0) ARE ONLY ACCESSED BY THE LDC/STC INSTRUCTIONS

| R0 (BANK1)/R0 (BANK0) |
|---|
| R1 (BANK1)/R1 (BANK0) |
| R2 (BANK1)/R2 (BANK0) |
| R3 (BANK1)/R3 (BANK0) |
| R4 (BANK1)/R4 (BANK0) |
| R5 (BANK1)/R5 (BANK0) |
| R6 (BANK1)/R6 (BANK0) |
| R7 (BANK1)/R7 (BANK0) |

FIG. 6

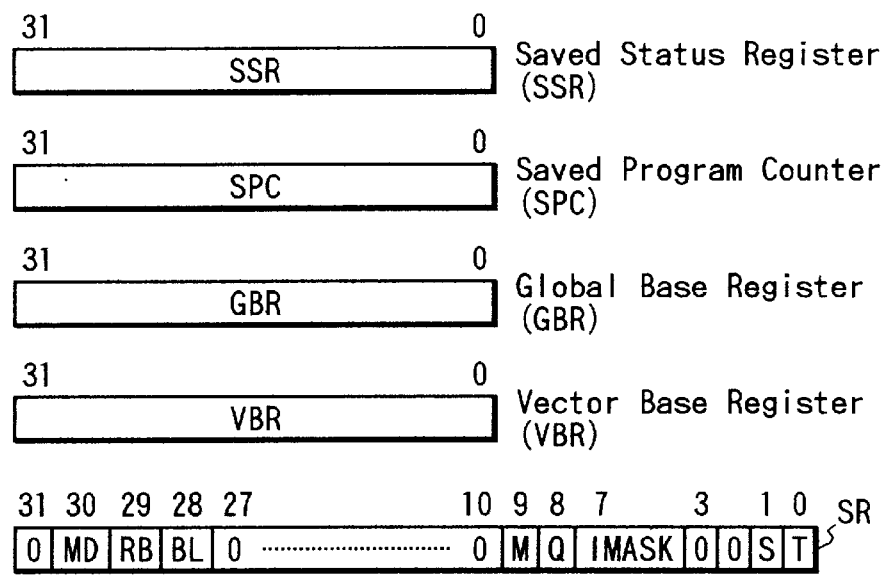

Status Register

| T bit | : Indicating a carry, bollow, overflow, or underflow |
|---|---|
| S bit | : Used by the MAC instruction |
| IMASK | : 4-bit field indicating the interrupt request mask level |
| M & Q bits | : Used by the DIV0 U/S and DIV1 instructions |
| RB | : Register bank bit, used to define the general-purpose registers in privileged mode. A logic one designates R0~R7(BANK1) and R8~R15 are accessed as general-purpose register, and R0~R7(BANK0) are only accessed by LDC/STC instructions; and A logic zero designates R0~R7(BANK0) and R8~R15 are accessed as general-purpose register, and R0~R7(BANK1) are only accessed by LDC/STC instructions |
| BL | : Block bit, used to mask exceptions in privileged mode, as follows;<br>BL=1, exceptions are masked (not accepted)<br>BL=0, exceptions are accepted |
| MD | : Processor Operation Mode bit, indicates the processor operation mode, as follows;<br>1 = Privileged mode<br>0 = User mode |

FIG. 7

Vectored Exception Events

| Exception Type | Current Instruction | Exception Events | Priority Level *1 | Exception Order | Vector Address | Vector Offset |
|---|---|---|---|---|---|---|
| Reset | Aborted | Power-On | 1 | — | H'A0000000 | — |
| | | Manual Reset | 1 | — | H'A0000000 | — |
| General Exception Events | Aborted and Retrieved | Address Error (Instr. Access) | 3 | 2 | — | H'00000100 |
| | | TLB Miss (Instr. Access) | 3 | 3 | — | H'00000400 |
| | | TLB Protection Violation (Instr. Access) | 3 | 5 | — | H'00000100 |
| | | Reserved Instruction Exception | 3 | 6 | — | H'00000100 |
| | | Illegal Slot Instruction Exception | 3 | 6 | — | H'00000100 |
| | | Address Error (Data Access) | 3 | 7 | — | H'00000100 |
| | | TLB Miss (Data Access) | 3 | 8 | — | H'00000400 |
| | | TLB Invalid (Data Access) | 3 | 9 | — | H'00000100 |
| | | TLB Protection Violation (Data Access) | 3 | 10 | — | H'00000100 |
| | | Initial Page Write | 3 | 11 | — | H'00000100 |
| | Completed | Unconditional Trap (TRAP instruction) | 3 | 6 | — | H'00000100 |
| | | User Breakpoint Trap | 3 | n *2 | — | H'00000100 |
| General Interrupt Request | Completed | Nonmaskable Interrupt | 2 | — | — | H'00000600 |
| | | External Hardware Interrupt | 4 *3 | — | — | H'00000600 |
| | | Peripheral Module Interrupt | 4 *3 | — | — | H'00000600 |

*1 Priority level is assigned from 1 to 4 in highest to lowest order, with level 1 the highest priority and level 4 the lowest

*2 A breakpoint trap may be user-defined for a preexecution instruction breakpoint (n=1), postexecution instruction breakpoint (n=12), or operand breakpoint (n=12)

*3 Relative priority between external hardware interrupts and peripheral module interrupt is defined by software

FIG. 8

EXPEVT Register and INTEVT Register Exception Code

| Exception Type | Exception Event | Exception Code |
|---|---|---|
| Reset | Power-On | H' 000 |
| | Manual Reset | H' 020 |
| General Exception Events | TLB Miss/Invalid(load) | H' 040 |
| | TLB Miss/Invalid(store) | H' 060 |
| | Initial Page Write | H' 080 |
| | TLB Protection Violation(load) | H' 0A0 |
| | TLB Protection Violation(store) | H' 0C0 |
| | Address Error(load) | H' 0E0 |
| | Address Error(store) | H' 100 |
| | Unconditional Trap(TRAP instruction) | H' 160 |
| | Reserved Instruction Exception | H' 180 |
| | Illegal Slot Instruction Exception | H' 1A0 |
| | User Breakpoint Trap | H' 1E0 |
| General Interrupt Events | Nonmaskable interrupt | H' 1C0 |
| | External Hardware Interrupt | |
| | IRL3~IRL0=0000 | H' 200 |
| | IRL3~IRL0=0001 | H' 220 |
| | IRL3~IRL0=0010 | H' 240 |
| | IRL3~IRL0=0011 | H' 260 |
| | IRL3~IRL0=0100 | H' 280 |
| | IRL3~IRL0=0101 | H' 2A0 |
| | IRL3~IRL0=0110 | H' 2C0 |
| | IRL3~IRL0=0111 | H' 2E0 |
| | IRL3~IRL0=1000 | H' 300 |
| | IRL3~IRL0=1001 | H' 320 |
| | IRL3~IRL0=1010 | H' 340 |
| | IRL3~IRL0=1011 | H' 360 |
| | IRL3~IRL0=1100 | H' 380 |
| | IRL3~IRL0=1101 | H' 3A0 |
| | IRL3~IRL0=1110 | H' 3C0 |
| | IRL3~IRL0=1111 | H' 3E0 |
| | Peripheral Module Interrupt | H' 400 |
| | ↓ | ↓ |

FIG. 9

EXPEVT

```
 31                              12 11              0
┌──────────────────────────────────┬───────────────┐
│ 0 ·························· 0   │ EXCEPTION CODE│
└──────────────────────────────────┴───────────────┘
```

INTEVT

```
 31                              12 11              0
┌──────────────────────────────────┬───────────────┐
│ 0 ·························· 0   │ EXCEPTION CODE│
└──────────────────────────────────┴───────────────┘
```

TRAP REGISTER
   TRA

```
 31                            9      2      0
┌──────────────────────────────┬──────┬──────┐
│ 0                          0 │ imm  │  00  │
└──────────────────────────────┴──────┴──────┘
```

0   ; reserved bits, always read as zero
imm ; 8-bit immediate data in TRAP instruction

SINGLE-CHIP DATA PROCESSOR HANDLING SYNCHRONOUS AND ASYNCHRONOUS EXCEPTIONS BY BRANCHING FROM A FIRST EXCEPTION HANDLER TO A SECOND EXCEPTION HANDLER

BACKGROUND OF THE INVENTION

The present invention relates to a data processor for executing an exception handling program to cope with the occurrence of exceptions such as reset event, exception events and interrupt events. More specifically, the invention relates to technology for shortening the time required for the transition from a moment of occurrence of an exception event to the operation of an exception handler for coping with the exception event. The invention relates to technology that can be effectively adapted to, for example, a single-chip microcomputer or a microprocessor contained in a memory management unit (MMU).

In processing the data using a central processing unit that is included in the data processor, there may often occur general exception events such as decoding of undefined instruction in an instruction set of the data processor, invalid arithmetic operation, protection violation in a virtual storage, TLB miss exception events, etc., as well as end signaling for informing the central processing unit of the end of of the data processor and interrupt requests (referred to as general interrupt events) such as request of reception from a communication module in the data processor.

When exception events such as the above-mentioned general exception events and general interrupt events occur, the central processing unit suspends the execution of instructions of a data processing program, shifts the control to an exception handler to cope with exceptions that have occurred, executes the data processing specified by the exception handler, and works to cope with the exception events. After the exception handler is executed, the central processing unit retries the suspended instruction or returns to an instruction address next to the suspended instruction, and resumes the suspended data processing program. Therefore, if general exception events and general interrupt events occur, the central processing unit executes the operation to save values of a program counter therein and internal conditions of the status register into the stack regions of an external memory. When the processing of the central processing unit returns from the exception handler to the suspended data processing program, the central processing unit transfers the values saved in the program counter and the internal conditions of the status register from the stack regions of the external memory to the program counter and to the status register, respectively, and continues the suspended data processing program.

A predetermined data processing program has been branched to a predetermined exception handler by a method of fixing a variety of destination addresses (head memory addresses of a variety of exception handlers) using a hardware (logic circuit) or by a vector system which designates destination addresses from the central processing unit. According to the vector system, for example, a vector table storing head addresses of a variety of exception handlers for responding to an interrupt request is arranged on an external memory, a pointer (interrupt vector register) of the vector table is designated from the central processing unit, the head address of a corresponding exception handler is read out from the designated vector table, and a desired exception handler is read out from a position of the head address that is read out and is executed.

As a literature describing exception events such as interrupt requests, there can be cited "MICROCOMPUTER HANDBOOK", Ohm Co., Dec. 25, 1987, pp. 177–178.

SUMMARY OF THE INVENTION

The above-mentioned vector system, however, requires the operation for reading the external memory to obtain a head address of a corresponding exception handler from the vector table from the occurrence of an exception event up to dealing with it. Therefore, the time required for the transition from the occurrence of the exception event to the branching to a corresponding handler increases by the amount of operation for reading the external memory. Moreover, when the data in the program counter, in the status register and in the general-purpose register are to be saved to the stack regions of the external memory prior to branching to a corresponding exception handler, response to the exception event is delayed even by the operation for writing data into the external memory.

In particular, a quick response to an exception event, related to TLB miss exception event that occurs in synchronism with the operation of the central processing unit, means that the time can be shortened from the moment of occurrence of TLB miss exception event to the retry of the suspended instruction. The present inventors have discovered that this is quite important for enhancing data processing performance of the central processing unit. This is because, though it is classified as an exception event, the TLB miss exception event is an event that usually occurs during the execution of a data processing program free from mistake and is substantially different from exception events that occur due to a mistake involved in the data processing program prepared by a user. Therefore, to quickly cope with TLB miss exception events is to improve data processing performance of the central processing unit.

A method can be further contrived to completely fix a variety of destination addresses by hardware. However, this method is little versatile for mapping the exception handlers related to the user description or for the program sizes, and is little convenient to use. It is further considered that the amount of hardware increases for forming destination addresses.

The object of the present invention is to provide a data processor which is capable of shortening a transition time of from the moment of occurrence of an exception event up to shifting or branching the processing into an exception handler for coping with it.

Another object of the present invention is to provide a data processor which is capable of providing the constitution of exception handler with freedom to respond to exception events.

A further object of the present invention is to provide a data processor which is capable of shortening the transition time for a processing such as of a TLB miss exception event which can make it possible to execute the data processing at high speeds, and is also capable of offering high degree of versatility for the mapping of exception handlers on the memory and for the memory sizes of the exception handlers concerning those exception events and interrupt events which may not much contribute to executing the data processing at high speeds so much as the TLB miss exception events.

A still further object of the present invention is to provide a low-cost and high-speed data processor capable of satisfying both contracting the physical circuit scale from the standpoint of handling exception events and executing the data processing at high speeds.

The above and other objects as well as novel features of the present invention will become obvious from the description of the specification and the accompanying drawings.

Among the inventions disclosed in this application, representative examples will now be briefly described below.

Referring to FIG. 1, a single-chip data processor comprises:

a storage circuit (EXPEVT, INTEVT) into which, in response to an exception event, an exception code assigned in advance to it (such as reset event, general exception events, general interrupt requests) is stored; and a central processing unit (CPU) including a program counter (PC), and a control means (CTRL) which, in response to an exception event, writes a predetermined instruction address into said program counter so that a first exception handler assigned to said instruction address may be executed.

In accordance with a processing specified in the first exception handler, the control means calculates a second instruction address for branching into a second exception handler from the first exception handler by utilizing the exception code written into the storage circuit as an address offset, and sets the obtained second instruction address to the program counter.

Branching into the predetermined instruction address is, for example, carried out by operating a vector point that is obtained by hardware as shown in FIG. 2. As shown in FIG. 2, a first exception handler assigned to the predetermined instruction address (vector point at a destination) is an exception handler for a TLB miss exception event which is a general exception event specific to the vector point, is a common exception handler for a plurality of general exception events (e.g., a plurality of general exception events other than TLB miss exception events) specific to the vector point, or is a common exception handler for a plurality of interrupt events. In the common exception handler, the above-mentioned exception code is utilized as an address offset for branching into another exception handler (second exception handler) specific to individual exceptions. A base address for the exception code (address offset) is determined by the description of the common exception handler. The base address may be, for example, VBR (value of vector base register)+H'100 (symbol H' means hexadecimal notation), or a value of the program counter at the time of branching, or a value obtained through a suitable calculation.

From another point of view, the single-chip data processor possesses vector offsets which are fixed offsets for the vector base addresses in a number smaller than the number of exception events in order to change the order of executing instructions by the central processing unit depending upon the occurrence of exception events.

A single-chip data processor according to the present invention comprises a first saved register (SSR) in which internal conditions of a status register are stored when an exception event occurs, and a second saved register (SPC) which stores a return instruction address corresponding to an instruction stored in said program counter and to be executed after the return from the exception handling. Employment of the first and second saved registers makes it possible to decrease the number of times of access to the external memory for saving the internal conditions of the status register and return instruction addresses.

According to the present invention, furthermore, the central processing unit in the single-chip data processor includes an arithmetic and logic operation circuit (ALU), a constant generating unit or an operation means (CVG, SFT) which generates a predetermined value (vector offset) in response to the occurrence of an exception event, and a base register (VBR) for storing base addresses of a plurality of exception handlers stored in an external memory, and operates a vector point obtained by hardware shown in FIG. 2. Being controlled by the control circuit, the arithmetic and logic operation circuit adds a base address and a predetermined value together to generate a predetermined instruction address (destination instruction address). According to FIG. 2, for instance, vector offsets of general exception events other than the TLB miss exception events are denoted by H'100, and vector offsets of the TLB miss exception events are denoted by H'400. The constant-generating unit is constituted by a constant-generating circuit (CVG) that generates a constant value of two bits and a shifting circuit (SFT) that shifts by a predetermined amount the constant value of two bits output from the constant-generating circuit, featuring a simplified circuit constitution.

The register which is a storage circuit for storing exception codes is constituted of a first register (EXPEVT) assigned to first exception events (e.g., general exception events) that occur in synchronism with the operation of the central processing unit (CPU) and a second register (INTEVT) assigned to second exception events (e.g., interrupt events) that occur out of synchronism with the operation of the central processing unit. The reset event is included in the group of second exception events.

The status register (SR) includes a first control bit (MD) which decides whether the single-chip data processor is in a user state in which a user program is running or a supervisor state in which a system program is running, and a second control bit (BL) which decides whether to accept other exception events that follow the above-mentioned exception events.

The control means saves the internal conditions and the restored instruction addresses in the first saved register (SSR) and in the second saved register (SPC), respectively, and then sets to the first control bit the data representing the supervisor state, sets to the second control bit the data indicating that the other exception events that follow the above-mentioned exception events should be masked, and branches the processing to the first exception handler assigned to the predetermined instruction address. Access to the first and second control bits is accomplished relying upon a predetermined supervisor instruction (e.g., LDC, STC).

That is, as shown in FIG. 2, the processor mode on the first exception handler assigned to the vector point is in a supervisor state masking multiple acceptance of exception events. Here, the supervisor state is different from the user state in regard to that the supervisor state makes it possible to access to address space which in the user state could be an address error as well as to execute a supervisor instruction (e.g., LDC, STC) that cannot be executed in the user state.

In order that the internal conditions and the return address can be saved in the first and second saved registers when an exception event occurs, it is determined whether multiple acceptance of new exception events should be masked or not on the first exception handler assigned to the vector point, and the content thereof is reflected on the control bit. When multiple exception events are to be accepted, the contents of the first and second saved registers are saved in the memory.

In order to decrease the frequency of saving the content of the general-purpose register in the memory when an exception event occurs or to increase the degree of freedom of processing for the general-purpose register, there are provided first and second general-purpose register sets to constitute a plurality of banks. One of the first and second general-purpose register sets is used as general-purpose registers in the supervisor state, and the other one of the first and second general-purpose register sets is used as general-purpose registers in the user state. It is desired that the register banks of the general-purpose registers are changed over by software in the supervisor state only.

According to the present invention, the single-chip data processor further has an instruction break controller (UBC). The instruction break controller (UBC) includes an instruction break address register (IBR) to which a break point address is set, and generates an instruction break exception event when an instruction corresponding to the instruction address that is set to the instruction break address register is executed by the central processing unit. When the instruction break exception is detected in a state where it is instructed to mask the acceptance of multiple exception events, the control means does not save the internal conditions and the return instruction address in the first and second saved registers but branches the processing to the instruction break exception handler. The instruction break exception handler saves the above-mentioned conditions and the contents of the saved register for saving return address in the memory, calculates the return instruction address from the instruction break exception handler by utilizing a break point address held by the instruction break address register, and writes the return instruction address that is calculated into the second saved register. Thus, the instruction break exception event is processed by the exception handler in a state where multiple acceptance of the exception events has been masked.

In the state of masking the multiple acceptance of exception events, furthermore, when a first exception event other than the instruction break exception event is detected, the control means records the exception code thereof into the exception register and then branches the processing to a reset exception handler. When a second exception event is detected, furthermore, the control means masks the acceptance of the second exception event until the state of masking the multiple acceptance of exception events is reset.

The following effects are obtained from the above-mentioned means.

The first exception handler to which the vector point is assigned is regarded, for given exception events (e.g., TLB miss exception events), to be an exception handler specific thereto and is regarded, for other exception factors (e.g., general exception events other than TLB miss exception events), to be a common exception handler including a description for branching to a second exception handler (e.g., address error exception events, TLB protect violation exception events) which is a separate exception handler provided for each of the factors.

In the former case, branching is accomplished to a particular first exception handler relying only upon the processing by hardware without accompanied by memory access, and the process can be shifted to a desired exception processing at a high speed. In the latter case, the address of a destination can be obtained without accessing the address table on the memory since an exception code of a memory circuit (exception register) is utilized as an address offset for branching to another handler, and the same effects can be obtained.

From another point of view, the exception code held in the exception register in the latter case is so assigned as can be utilized as an address offset for branching to a further exception handler. For instance, the codes are assigned maintaining a gap of H'20 that corresponds to 32 bytes reckoned as addresses.

In the latter case, furthermore, the exception code is utilized as an address offset for branching. Accordingly, the base address for the above offset can be freely determined according to description of the first exception handler assigned to the vector point determined by hardware, making it possible to guarantee the degree of freedom for the practical address of destination or for the size of the exception handler at the destination.

Employment of the register (SSR, SPC) for saving the internal conditions and return instruction address, decreases the memory access during the saving when an exception event has occurred.

When the operation clocks of the central processing unit has a multiple of the frequency of the operation clocks of peripheral modules which are regarded to be sources of generating interrupt events, registers for storing exception codes are provided for the first exception events generated in synchronism with the operation of the central processing unit and for the second exception events generated out of synchronism therewith, to cope with both the general exception events which are the first exception events and the interrupt events which are the second exception events. This is to avoid complex processing for writing exception codes into a common register at similar timings for the occurrence of the two exception events.

By setting the initial processor mode on the handler at a destination (first exception handler) determined by hardware depending upon the exception events, to be constant relying upon the state of masking multiple acceptance of exception events and upon the supervisor state, it is allowed to guarantee a high degree of freedom for the content of exception handling specified by the user on the handler.

With the register banks of the general-purpose registers being allowed to be changed over by software only in the supervisor state, it is allowed to utilize in the supervisor state a general-purpose register of a bank which is different from that of the user state. When, for example, the processor mode is changed over from the user state to the supervisor state in the exception event processing, the content of the general-purpose register need not be saved in the memory, and the processing can be shifted at a high speed to the exception event processing.

With the instruction break exception events being processed in the exception handler in a state of masking exception events, it is allowed to evaluate the system or to debug the program by applying instruction break at any position even for the programs that are to be debugged in the state where acceptance of multiple exception events is masked.

BRIEF DESCRIPTION OF THE DRAWINGS

FIG. 3 is a diagram illustrating general-purpose registers constituting banks and system registers;

FIG. 5 is a diagram illustrating the states of general-purpose registers and system registers of FIG. 3 in a supervisor mode;

FIG. 6 is a diagram illustrating a control register;

FIG. 7 is a diagram illustrating interrupt factors and assignment of vector offsets;

FIG. 8 is a diagram illustrating the correspondence between the interrupt events and the exception codes assigned thereto;

FIG. 9 is a diagram illustrating an exception register and a trap register;

EMBODIMENTS
Outline of the microcomputer

Figure 1:
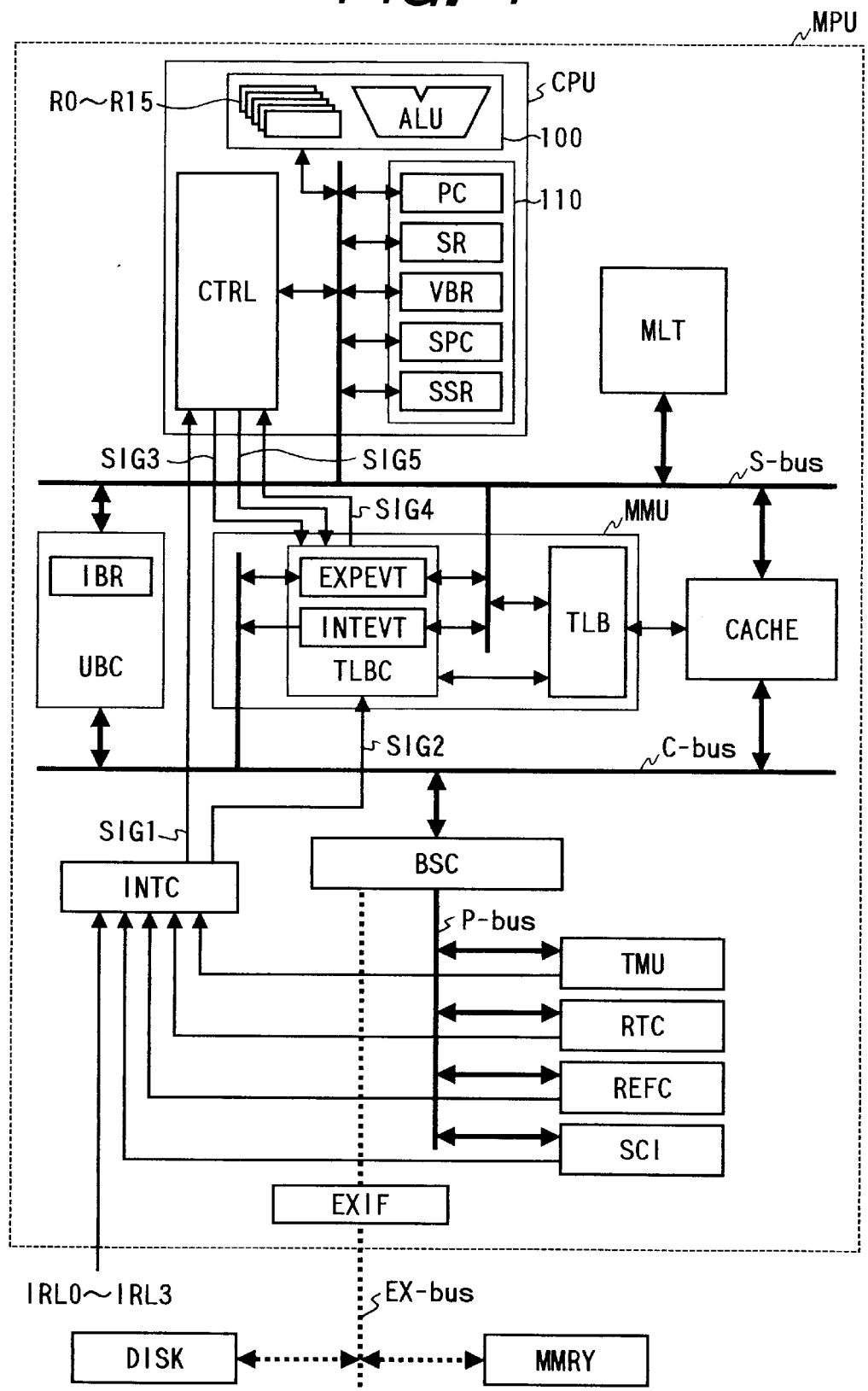
FIG. 1 is a block diagram of a single-chip microcomputer according to an embodiment of the present invention.

FIG. 1 is a block diagram of a single-chip microcomputer (often referred to as a single-chip microprocessor) according to an embodiment of the present invention. The microcomputer MPU shown in FIG. 1 is formed in a single semiconductor substrate or chip such as of single-crystal silicon by a known semiconductor integrated circuit process. Though there is no particular limitation, the microcomputer MPU includes internal buses, which are a system bus S-bus, a cache bus C-bus and a peripheral bus P-bus. That is, the microcomputer MPU has a three-bus constitution. Each of the internal buses S-bus, C-bus and P-bus has a data bus for transferring data, an address bus for transferring address signals, and a control bus for transferring control signals.

The system bus S-bus are connected with a central processing unit CPU, a multiplier MLT, a cache memory CACHE, a memory management unit MMU and an instruction break controller UBC. The cache bus C-bus are connected with the cache memory CACHE, the memory management unit MMU, the instruction break controller UBC, and a bus state controller BSC. The peripheral bus P-bus connected to the bus state controller BSC are connected with internal peripheral modules such as a timer TMU, a real time clock circuit RTC which continues the timekeeping operation even when the supply of operation clocks to the central processing unit CPU is interrupted, a refresh controller REFC for controlling the refresh operation of the dynamic memory included in the external memory MMRY, and a serial communication interface SCI that executes serial communication with external peripheral devices provided outside the microcomputer MPU. The bus state controller BSC is connected to an external bus EX-bus via an input/output circuit EXIF. To the external bus EX-bus is connected an external memory MMRY and an auxiliary storage device DISK. The bus state controller BSC executes the start of bus cycles for the above-mentioned peripheral modules and for the external units, and executes a variety of bus control operations.

The interrupt controller INTC receives external interrupt requests from the peripheral modules and from external interrupt terminals IRL0 to IRL3 of a plurality of bits, and arbitrates interrupt requests in accordance with the interrupt priority levels. To accept an interrupt request, the interrupt controller INTC sends an interrupt request signal SIG1 to the central processing unit CPU. The interrupt controller INTC informs the control circuit TLBC of the memory management unit MMU of an interrupt event of the interrupt request that is accepted in the form of an event signal. The central processing unit CPU that has received the interrupt request signal SIG1 sends an interrupt acknowledge signal SIG3 to the control circuit TLBC of the memory management unit MMU. In response to the interrupt acknowledge signal SIG3, the control circuit TLB of the memory management unit MMU writes an exception code corresponding to the acknowledged interrupt request into an interrupt event register INTEVT which is a memory circuit. By using the exception code set to the interrupt event register INTEVT, the control unit CTRL in the central processing unit CPU branches the processing from the processing of data process program being executed into a predetermined interrupt processing.

The microcomputer MPU of this embodiment divides the logical address space into units called logical pages, and supports the virtual memory to effect the address translation into physical address with the page as a unit. An address translation look-aside buffer TLB of the memory management unit MMU stores a plurality of translation pairs related to the logical page numbers and to the physical page numbers as TLB entries. The control unit TLB of the memory management unit MMU carries out the control operation to convert the logical address output by the central processing unit CPU into a physical address by using an address translation look-aside buffer TLB. In the case of a TLB miss exception event, i.e., when the translation pair corresponding to the logical address output by the central processing unit CPU has not been stored in the address translation look-aside buffer as the TLB entry, the control unit TLBC accesses a page table on the external memory MMRY and reads a translation pair corresponding to the logical address from the external memory MMRY. Thereafter, the control unit TLBC writes the translation pair into the address translation look-aside buffer TLB as the TLB entry.

The address translation look-aside buffer TLB may include a 4-way-set-associative cache memory. When a variety of exception events occur as will be described later due to address translation such as TLB error, the control unit TLBC sets an exception code corresponding to the exception event to the exception register EXPEVT which is a memory circuit that will be described later, and feeds a notice signal SIG4 for notifying the occurrence of exception event related to the address translation such as TLB miss exception event to the control unit CTRL of the central processing unit CPU. The central processing unit CPU branches the processing from the processing of a data process program being executed to a corresponding exception processing by using the exception code that is set to the exception register EXPEVT or directly by hardware without using the exception code set to the exception register EXPEVT.

The central processing unit CPU utilizes an address signal of 32 bits to support logical address space of, for example, 4 gigabytes. As shown in FIG. 1, the central processing unit CPU includes an operation unit 100 made up of general-purpose registers R0 to R15 and an arithmetic and logic unit ALU; a system control register set 110 such as a program counter PC that will be described later; and a control unit CTRL which fetches instruction, decodes instruction, controls the execution procedure of instruction and controls arithmetic operation. These circuits (R0 to R15, ALU, 110, CTRL) are coupled to the system bus S-bus. The central processing unit CPU fetches an instruction from the external memory MMRY, and processes the data depending upon an instruction code thereof. In FIG. 1, a control signal SIG5 stands for a variety of control signals sent from the central processing unit CPU to the memory management unit MMU and signals for notifying the internal conditions of the central processing unit CPU.

Though there is no particular limitation, the cache memory CACHE is in a 4-way-set-associative form. An index to the cache memory CACHE consists of a part of a logical address output from the central processing unit CPU, and a physical address is held by a tag portion of cache entry of the cache memory CACHE. The logical address output from the indexed tag portion is compared with a physical address that is translated by the address translation look-aside buffer TLB, and a cache miss/hit is judged depending upon the result of comparison. In the case of a cache miss, the data or instruction related to the cache miss is read from the external memory, and the data or instruction that is read is stored as a new cache entry in the cache memory CACHE.

The instruction break controller UBC is provided to reinforce the debugging function, and monitors whether the state of the system bus S-bus is in agreement with the break condition or not. When the state of the system bus S-bus is in agreement with the break condition, the central processing unit CPU generates a break interrupt. The IBR included in the instruction break controller UBC is an instruction break address register to which will be set an instruction address and the like as break conditions. The central processing unit CPU executes a service routine prior to starting debugging or emulation, and sets in advance desired instruction break conditions such as head address of an instruction to be broken and operand address to the instruction break address register IBR. When the internal conditions of the microcomputer MPU come in agreement with the instruction break conditions, an instruction break exception event occurs as will be described later. Therefore, the central processing unit CPU enables the instruction break handler for debugging to be executed. It is therefore allowed to control the break point inside the microcomputer MPU.

Constitution of Registers in the CPU

Described below is the constitution of registers in the central processing unit CPU.

Figure 4:
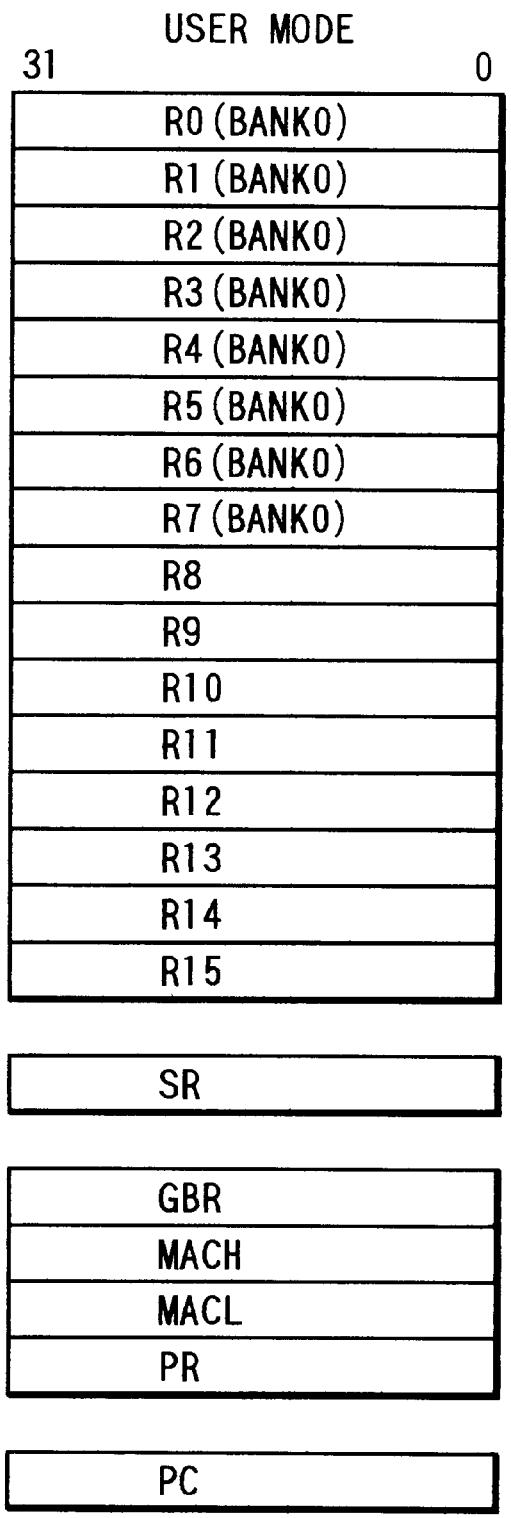
FIG. 4 is a diagram illustrating the state of general-purpose registers and system registers of FIG. 3 in the user mode.

As shown in FIG. 3, the general-purpose registers R0 to R15 each have 32 memory bits, and are coupled to the system bus via an interface circuit (not shown). The general-purpose registers R0 to R7 are bank registers that are changed over by a processor mode. In other words, the general-purpose registers R0 to R7 are provided in two sets, i.e., banks 0 and banks 1. That is, R0 (BANK0) to R7 (BANK0) which pertain to a first general-purpose register set, and R0 (BANK1) to R7 (BANK1) which pertain to a second general-purpose register set. The processor mode includes a user mode (user state) meaning an operation state in which an application program of a user runs and a supervisor mode (supervisor state) meaning an operation state in which a system program such as operating system runs. Accordingly, the supervisor state and the user state can have their specific general-purpose registers R0 to R7, respectively. That is, in the user stage shown in FIG. 4, general-purpose registers R0 (BANK0) of bank 0 are utilizable. In the supervisor state, the mode for utilizing the general-purpose registers R0 to R7 are determined depending upon the state of setting register bank bits RB (SR, RB) of a status register SR that will be described later.

In the supervisor state as shown in, for example, FIG. 5, when RB=0, then, R0 (BANK0) to R7 (BANK0) are per- mitted to be freely used as general-purpose registers, and R0 (BANK1) to R7 (BANK1) are accessed by only the control load instruction (LDC) and the control store instruction (STC). When RB=1, contrary to the above, R0 (BANK1) to R7 (BANK1) are permitted to be freely used as general-purpose registers, and R0 (BANK0) to R7 (BANK0) are accessed by only the control load instruction (LDC) and the control store instruction (STC). The control load instruction (LDC) and the control store instruction (STC) are only some examples of the supervisor instruction or the system control instruction that can be executed in the supervisor state.

By constituting the general-purpose registers as bank registers and by using, in the supervisor state, general-purpose registers of a bank different from that of the user state, there is no need of saving the contents of the general-purpose registers R0 to R7 used in the user state into the stack regions of the external memory MMRY when the processor mode is changed from the user state over to the supervisor state in processing exception events. Accordingly, the central processing unit CPU can be shifted to the exception event processing at a high speed.

Referring to FIG. 3, the system register includes a data register high MACH, a data register low MACL, a return address register PR and a program counter PC. The data register high MACH and the data register low MACL store data for multiplication, addition and for calculating the sum of products. The return address register PR stores return address from the subroutine. The program counter PC indicates a start address of the current instruction.

Referring to FIG. 6, the control register includes a saved status register SSR, a saved program counter SPC, a global base register GBR, a vector base register VBR and a status register SR. The saved status register SSR is the one in which the current values of the status register SR is stored if an exception event occurs. The saved program counter SPC is a register for holding an instruction address of an instruction to be executed by the central processing unit CPU after it returns from the corresponding exception event processing in the case of an exception. The saved program counter SPC stores values of the program counter PC at predetermined timings if an exception event occurs. The global base register GBR is a register for storing base address in the GBR-indirect address mode. The GBR-indirect address mode is utilized at the time of transferring the data to the register regions of the embedded peripheral modules such as of serial communication interface SCI or at the time of logical operation. The vector base register VBR holds a base address (vector table base address) of a vector region for exception event processing. The status register SR includes a T bit used for indicating carry, borrow or overflow during the calculation, an S bit used for the memory access control, an interrupt mask bit IMASK that indicates a mask level for the interrupt request using 4 bits, A and Q bits used for the division, the above-mentioned register bank bit RB, a block bit BL, a processor operation mode bit MD and a zero bit. The block bit BL is used for masking an exception, BL=1 represents masking the exception events, and BL=0 represents permitting the exception. The mode bit MD represents the supervisor mode when MD=1, and represents the user mode when MD=0. The above-mentioned bits M, Q, S and T can be set or cleared by the central processing unit CPU that has executed a predetermined exclusive instruction. Other bits can all be read or written by the central processing unit CPU in the supervisor mode only. The data are written into the control register by the central processing unit CPU that executes the control load instruction LDC, and the data are read from the control register by the central processing unit CPU that executes the control store instruction STC.

Address Space of a Microcomputer

Figure 13:
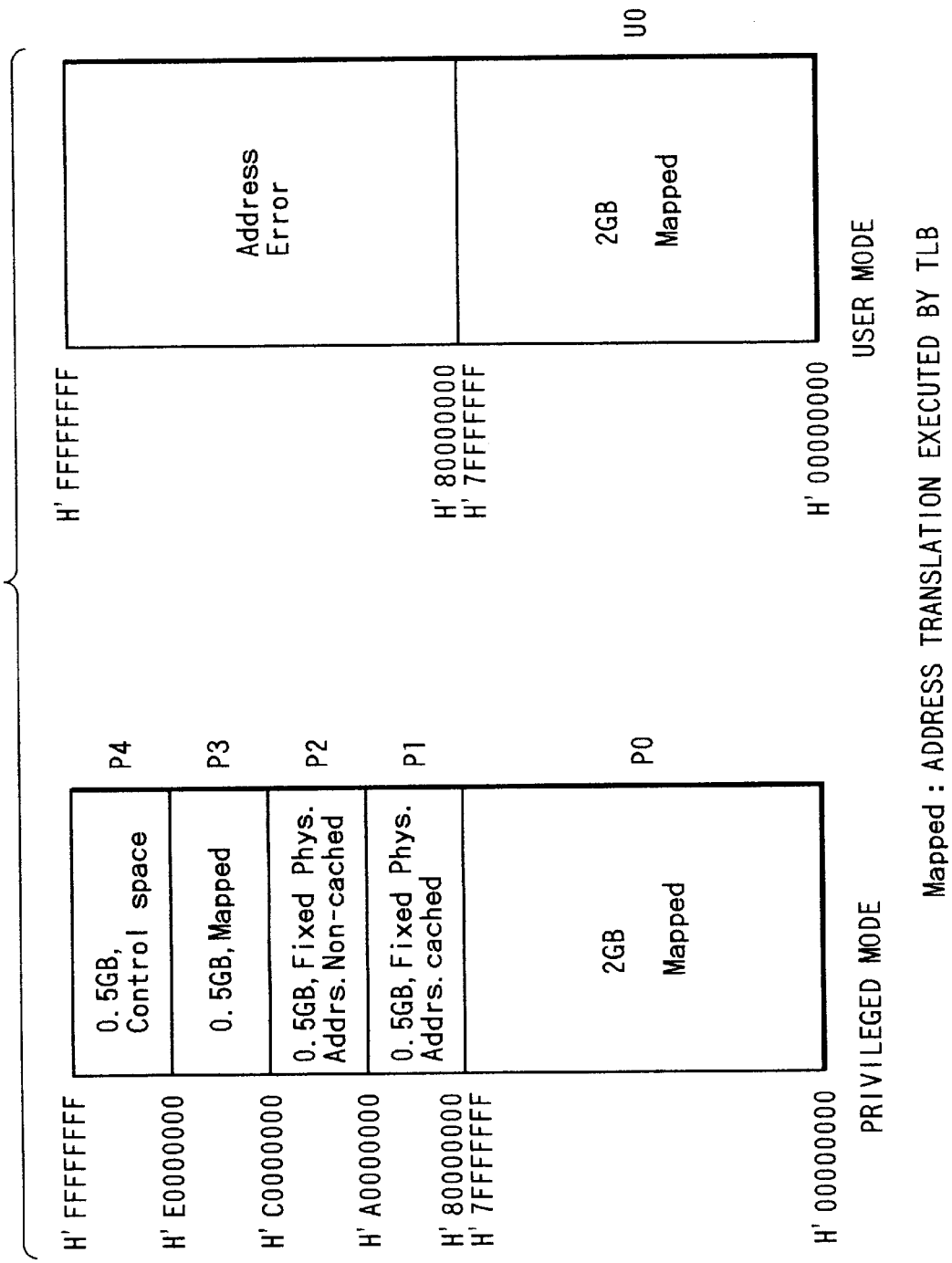
FIG. 13 is an address map of a microcomputer according to the embodiment.

The microcomputer MPU according to this embodiment uses an address of 32 bits in order to support logical address space of 4 GB (gigabytes). The logical address can be expanded depending upon a space number. FIG. 13 shows an address mapping between address space in the supervisor mode and address space in the user mode, wherein regions indicated as "Mapped" are subjected to the address translation by utilizing the address translation look-aside buffer TLB.

Regions H'FFFFFFFF to H'80000000 are accessible in the supervisor mode, and any access attempt in the user mode is regarded to be an address error.

The address region P4 is a control space in which are mapped control registers of peripheral modules.

The address regions P1, P2 have fixed physical addresses and are not subjected to the address translation by utilizing the address translation look-aside buffer TLB. Logical addresses of the address regions P1, P2 are translated into physical addresses by the addition or subtraction of predetermined constants. When the address regions P1 and P2 are being accessed in the supervisor state, therefore, there occur no exception event such as TLM miss exception event or those exception events related to address translation. With the physical addresses of a variety of exception handlers such as of general interrupt events and general exception events being assigned to the address region P1 or P2, there occurs no exception event such as TLM miss exception event or those exception events related to address translation during the processing of exception events. In other words, it is allowed to avoid multiple occurrence of exception events related to address translation, and the efficiency of data processing is much improved.

In particular, the address region P2 is not cached in the cache memory CACHE but the address region P1 is cached. As for the exception handlers, which exception handler among a plurality of exception handlers should be assigned to the address region P1 or P2, is determined depending upon the nature of the exception processing. It is advantageous to assign, to the address region P1, an exception handler which must be processed at high speeds like an exception handler for coping with a TLB miss exception event. On the other hand, it is advantageous to assign, to the address region P2, an exception handler which must not be processed at high speeds, since the cache memory is open to other data.

Outline of Exception Event Processing

The exception event processing requires a particular handling and exceptionally branches the currently executed program to another processing. The central processing unit CPU masks the execution of the current instruction (for the interrupt request that will be described later, the execution is allowed to be continued up to its completion), shifts the control to the exception handler according to user code to meet the request of exception event processing. For instance, the exception processing can be divided into three processings in relation to an instruction that is now being executed. A first processing is to branch to the exception handler processing aborting the instruction that is now being executed. A second processing is to retry the instruction that is now being executed after the processing of the exception handler is completed. A third processing is to branch to the exception handler processing after the completion of the instruction being executed in order to return to the state of before being branched after the processing is completed at a destination. The latter two processings can be distinguished as first exception events like general exception events and as second exception events like so-called interrupt events. The second exception event like an interrupt event occurs out of synchronism with the operation of the central processing unit CPU and is accepted in a step where the instruction being executed is completed. When the processing of the exception handler corresponding to the interrupt processing is finished, the processing of the central processing unit CPU returns to an instruction next to the executed instruction. The first exception event such as general exception event occurs in synchronism with the operation of the central processing unit CPU. After the cause of request is removed, therefore, the instruction executed by the central processing unit CPU is retried by the central processing unit CPU at a moment at which the request of exception event processing is issued. Needless to say, however, the exception event processings include those that are not in agreement with these two definitions.

FIG. 7 illustrates exception events assigned as vectors.

Referring to FIG. 7, the exception processing can be roughly divided into a reset event processing, a processing for exception events (general exception events) that occur in synchronism with the operation of the central processing unit CPU, and a processing for interrupt events that occur out of synchronism with the operation of the central processing unit CPU. In these exception event processings, the processing for the instruction being executed can be roughly divided into aborted, retried and completed as shown.

1) The reset event processing includes a power-on reset and a manual reset. The power-on reset is to initialize the central processing unit CPU and the embedded peripheral modules on condition that a reset signal is asserted upon the closure of the power source circuit.

2) The general exception events can be roughly divided into exception events that occur inside the central processing unit CPU and exception events that occur upon address translation by the memory management unit MMU.

The former exception events include reserved instruction exception, illegal slot instruction exception, unconditional trap and user breakpoint trap.

The latter exception events include address error at the time of accessing instruction and accessing data, TLB miss at the time of accessing instruction and accessing data, TLB invalid at the time of accessing instruction and accessing data, TLB protection violation at the time of accessing instruction and accessing data, and TLB initial page write.

The TLB miss exception event occurs when the addresses of the address translation look-aside buffer TLB are in agreement, and the page table entry of the logical address which is not in agreement is loaded onto the address translation look-aside buffer TLB from the external memory MMRY. A trap instruction exception event occurs on condition that a TRAP instruction is executed, and a processing is executed as defined by a destination handier using an immediate value of the instruction, which can be regarded as a software interrupt. A reservation instruction exception event occurs on condition that an undefined instruction code other than a delay slot is decoded by utilizing a delay branch instruction, and a processing is executed as defined by the handler at a destination. The instruction break exception event occurs on condition that the break conditions set to the register IBR are in agreement, and a processing is executed as defined by the handler at a destination.

3) The interrupt event includes a nonmaskable interrupt, an external hardware interrupt and a peripheral module interrupt.

Though there is no particular limitation, the priority level of exception event processing can be defined as shown in FIG. 7 and as described below. That is, a reset is assigned to a priority level 1, a general exception event is assigned to a priority level 3, a nonmaskable interrupt is assigned to a priority level 2, and other interrupt events are assigned to a priority level 4. These priority levels are 1 to 4 in the order from the highest priority to the lowest priority.

General exception events occur in relation to an execution sequence of instructions and are assigned to the priority level 3. To a variety of general exception events assigned to the priority level 3, one to twelve execution orders are assigned depending upon the timings for executing the instructions that are generated. When an instruction is executed like a pipe-line, a general exception event of a priority level 3 detected during the execution of a given instruction is accepted prior to other general exception events of the priority level 3 that are detected during the execution of a subsequent instruction. It is therefore regarded that the execution order is defining the priority order within an execution span of the individual instructions. In the instruction break exception (user break trap exception) in particular, the execution order of an instruction break exception is 1 when a trap is generated prior to executing an instruction that has been designated as a break point, the execution order of an instruction break exception is 12 when a trap is generated after the execution, and the execution order of an instruction break exception is 12 even when an operand break point has been set. The priority level between the external interrupt and the peripheral module interrupt is defined by software.

Referring to FIG. 7, some exception events in the general exception events are diagramed being distinguished depending upon during the instruction access and the data access. This is because, the description of general exception events of from address error to initial page write in FIG. 7 is listing exception events according to execution order of when a given instruction is executed like a pipeline. Therefore, the TLB miss (instruction access) and the TLB miss (data access) shown in FIG. 7 are processed by the same exception handler. The same holds true even for the address error (instruction access) and the address error (data access), for the TLB invalid (instruction access) and the TLB invalid (data access), and for the TLB protection violation (instruction access) and the TLB protection violation (data access).

In FIG. 7, a general exception event is assigned to the priority level 3 and a nonmaskable interrupt request is assigned to the priority level 2. It is, however, also allowable to assign a general exception event to the priority level 2 and a nonmaskable interrupt request to the priority level 3.

Vector Arrangement for Exception Event Processing

A variety of exception handlers for defining the contents of exception event processings are called by utilizing vector arrangements. The microcomputer MCU supports four kinds of vector arrangements depending upon the hardware constitution. A fixed physical address H'A0000000 is assigned as a vector for resetting. To other exception event processings is assigned an offset (vector offset) of a fixed address from a vector table base address that is set to the vector base register VBR by software. As shown in FIG. 7, the respective vector offsets are H'00000100, H,00000400 and H'00000600. H'00000400 is assigned to a vector offset of the TLB miss exception event, H'00000100 is assigned to a vector offset of a general exception event other than the TLB miss exception events, and H'00000600 is assigned to a vector offset of an interrupt event.

The base address of the vector table is loaded onto the vector base register VBR by the central processing unit CPU that executes software. In changing over the task or the processing, the vector base register VBR is set by the central processing unit CPU that executes a system program such as an operating system. The base address of the vector table is disposed in a predetermined fixed physical address space. That is, the base address of the vector table is disposed in the address regions P1 and P2. A vector point (vector address) determined by a value of the register VBR and by a vector offset, is specified by hardware. That is, the vector point is not of a nature that is specified by a program by a user code.

Figure 14:
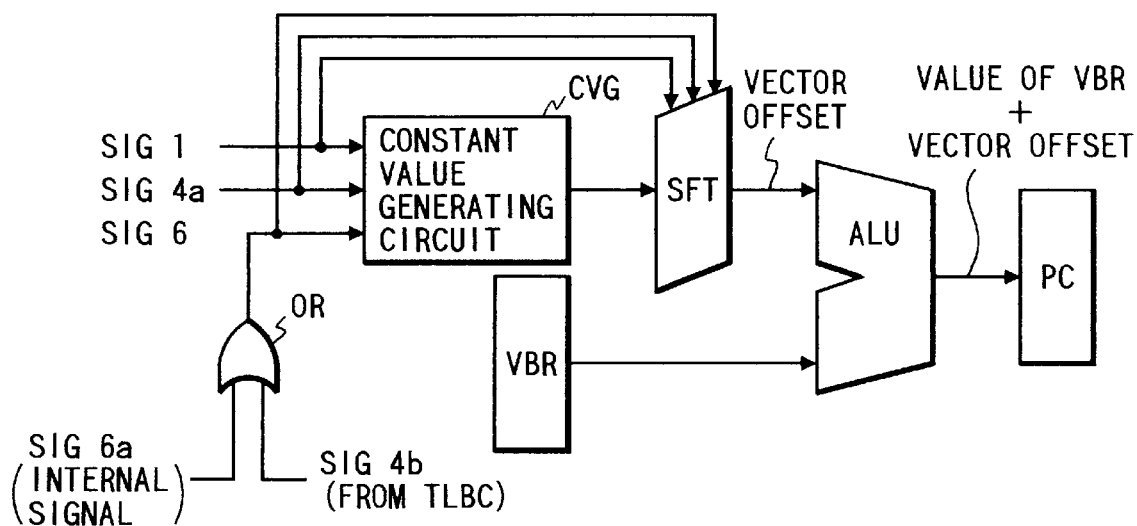
FIG. 14 is a block diagram of a hardware for forming a vector offset.

FIG. 14 illustrates the constitution of hardware for forming a value of vector offset as the above-mentioned fixed offset, and wherein a constant value generating circuit CVG and a shifter SFT are regarded to constitute a constant value generating unit or an operation means for forming vector offset. A value of vector offset and a value of vector base register VBR are added up by the arithmetic and logic operation unit ALU, and a vector point obtained by the addition is written into the program counter PC. Thereafter, the central processing unit CPU generates the vector point (logical address) on the address bus in the system bus S-bus in order to access an exception handler assigned to the vector point written into the program counter PC. Upon receiving the logical address that can be the vector point, the memory management unit MMU converts the logical address into a physical address when an address translation pair related to the logical address has been stored as an entry, and feeds the physical address to the cache memory CACHE. When an instruction corresponding to the physical address does not exist in the cache memory CACHE, the physical address is fed to the external memory MMRY via the address bus of cache bus C-bus, bus state controller BSC, input/output circuit EXIF and the address bus of external bus EX-bus. In synchronism with the output of the physical address to the address bus of external bus EX-bus, a read control signal (not shown) output from the central processing unit CPU is fed to the external memory MMRY via a control bus in the system bus S-bus, control bus of cache bus C-bus, bus state controller BSC, input/output circuit EXIF and control bus of external bus EX-bus. The external memory MMRY is accessed by the physical address, and the data (instruction data at the head of the first exception handler) stored in the physical address is fed to the central processing unit CPU via the data bus of external bus EX-bus, input/output circuit EXIF, bus state controller BSC, data bus of cache bus C-bus and data bus of system bus S-bus, and is executed.

The program counter PC set with a vector point, constant value generating circuit CVG, shifter SFT and arithmetic and logic operation unit ALU are included in the operation unit 100 of the central processing unit CPU.

The constant value generating circuit CVG and the shifter SFT are served with an interrupt notice signal SIGI, a notice signal SIG4*a* indicating the occurrence of a TLB miss exception event, and a notice signal SIG6 indicating the occurrence of a general exception event other than TLB miss exception events. The notice signal SIG4*a* is contained in the signal SIG4 that is output from the control unit TLBC in the memory management unit MMU. That is, the signal SIG4 consists of a plurality of bits and informs the central processing unit CPU of the occurrence of an exception event due to address translation in the memory management unit MMU as described earlier. The signal SIG4 includes a notice signal SIG4*a* indicating that an exception event that has occurred is a TLB miss exception event, and a notice signal SIG4*b* indicating that an exception event is different from TLB miss exception events. As shown, the notice signal SIG6 is output from an OR circuit OR that receives the signal SIG4b which is activated when an exception event other than TLB miss exception events occurs during the address translation in the memory management unit MMU, and the internal signal SIG6a that is activated when an exception event occurs in the central processing unit CPU.

In the above-mentioned constant value generating circuit CVG and the shifter SFT, a constant to be generated and a shifting amount are controlled depending upon which signal is activated among the signals SIG1, SIG4a and SIG6. The constant value generating circuit CVG generates a constant H'1(01) or H'3(11) of two bits in a binary code. The constant value generating circuit CVG generates a constant H'1 when the notice signal SIG4a or SIG6 is activated. The constant value generating circuit CVG generates a constant H'3 when the interrupt event notice signal SIG6 is activated. When the notice signal SIG6 is activated, the shifter SFT leftwardly shifts the constant H'1 (01) by 8 bits to output a vector offset H'100 (1.0000.0000). When the TLB miss exception event notice signal SIG4a is activated, the shifter SFT leftwardly shifts the constant H'1 (01) by 10 bits to output a vector offset H'400(100.0000.0000). When the notice signal SIGI is activated, the shifter SFT leftwardly shifts the constant H'3(11) by 9 bits to output a vector offset H'600 (110.0000.0000). In this embodiment, in particular, H,100, H'400 and H'600 are assigned as vector offsets in order to minimize the number of bits of a logical value "1" in the vector offset or, in other words, to reduce the logical scale of the constant value generating circuit CVG.

As will be obvious from FIG. 14, three kinds of vector offsets are formed by the hardware (circuit). Therefore, the hardware quantity includes only the 2-bit constant value generating circuit CVG and the shifter SFT. The shifter SFT needs not necessarily be used exclusively for forming vector offsets but may be generally used even for other calculations.

Exception Event Code for Indexing Exception Event Processing

Referring to FIG. 8, exception codes of different values are assigned for the different exception events in order to discriminate them. The exception codes are used for judging the exception events that have occurred in a software manner and are further used as address offset data for branching to an exception handler as will be described later. In order to use the exception codes in the debugging, the registers EXPEVT and INTEVT are connected to the cache bus C-bus and are accessed from outside the MEU via bus state controller BSC, input/output circuit EXIF and external bus EX-bus. That is, the exception codes stored in the registers EXPEVT and INTEVT can be output to the outside of the MCU. Accordingly, the debugger easily discriminates the exception event that has occurred from the exception code.

The exception codes shown in FIG. 8 are assigned for every H'20. If this is converted into an address, there is obtained an address offset for every 32 bytes. For instance, if an instruction has a fixed length of 2 bytes, the address range corresponds to the description of 16 instructions. Among the general exception events of FIG. 8, furthermore, different exception codes are assigned to the address error, TLB miss, TLB invalid and TLB protection violation depending upon the execution of load instruction and the execution of store instruction. As for the exception codes related to interrupt events of peripheral modules in FIG. 8, an exception code H'400 only is shown representatively. In practice, however, it should be noted that there exist many exception codes depending upon the number of peripheral modules and their functions.

The exception register EXPEVT shown in FIG. 9 is a 32-bit register which stores, in the memory bits 11 to 0, the exception codes assigned to resetting and to the general exception events among the above-mentioned exception codes. The interrupt register INTEVT is a 3-bit register which stores, in the bits 11 to 0, the exception codes assigned to interrupt events among the above-mentioned exception codes. As also shown in FIG. 1, these registers EXPEVT and INTEVT are connected to the system bus S-bus and to the cache bus C-bus, and are arranged in the control unit TLBC in the memory management unit MMU. This is because, it is the control unit TLBC in the memory management unit MMU that is capable of most quickly detecting the occurrence of general exception events such as TLB miss exception events that must be processed at high speeds.

The registers for storing the exception codes are separately provided for the general exception events and for the interrupt events because of the reasons described below. That is, general exception events occur in synchronism with the operation of the central processing unit CPU and interrupt events occur out of synchronism with the operation of the central processing unit CPU. Furthermore, the operation clock frequency of the central processing unit CPU is a multiple of, i.e., four times the operation clock frequency of the peripheral modules and of the external circuits which are sources of interrupt events. When consideration is given to a difference in the timings of occurrence of interrupt events and general exception events and to a difference in the operation speed between the source of interrupt events and the source of exception events, it becomes cumbersome to set the timings for writing exception codes into the register if the exception codes for the two events are written at the same timings into the same register.

Figure 15:
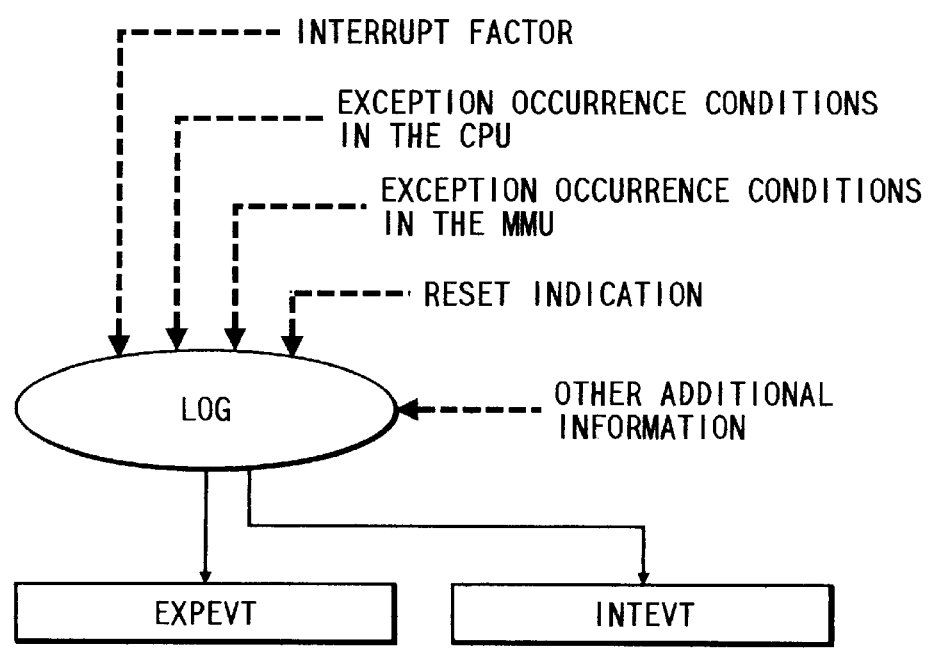
FIG. 15 is a block diagram of a logic for forming an exception code.

FIG. 15 illustrates the constitution of a logical block for forming the above-mentioned exception codes. The logic circuit LOG shown here is included in the control circuit TLB of the memory management unit MMU. The logic circuit LOG is served with an interrupt factor A, exception occurrence conditions B in the central processing unit CPU, except occurrence conditions C in the memory management unit MMU, reset indication D and other additional information E, and forms a corresponding exception code depending upon the conditions of these input data.

The interrupt factor A is as a signal SIG2 from the interrupt controller INTC to the logic circuit LOG. Other additional information E includes the notice signal SIG3 of interrupt accept. In response to the interrupt factor A and other additional information E that are activated, the logic circuit LOG forms an exception code that corresponds to the interrupt factor and sets the thus formed exception code to the interrupt register INTEVT.

The exception occurrence conditions B in the central processing unit CPU are fed to the logic circuit LOG from the central processing unit CPU as signals of a plurality of bits to distinguish the occurrence conditions of reserved instruction exception, illegal slot instruction exception, unconditional trap and user breakpoint trap. It is assumed that the exception occurrence conditions B are included in the signal SIG5 that is shown in FIG. 1.

Exception occurrence conditions C in the memory management unit MMU are fed to the logic circuit LOG as signals of a plurality of bits to distinguish the occurrence conditions of address error, TLB miss, TLB invalid, TLB protection violation and TLB initial page write.

The additional information E includes information E1 for distinguishing whether instruction related to address translation is a load instruction or a store instruction. The information E1 is obtained by decoding the instruction as executed in the central processing unit CPU and is fed to the logic circuit LOG from the central processing unit CPU.

The logic circuit LOG forms an exception code corresponding to a general exception event based upon exception occurrence conditions B in the central processing unit CPU, exception occurrence conditions C in the memory management unit MMU and additional information E, and sets the formed exception code to the exception register EXPEVT.

The logic circuit LOG responds to a reset indication D formed by a reset signal, and forms an exception code which is related to the resetting. The formed exception code related to the resetting is set to the exception register EXPEVT from the logic circuit LOG. It is assumed that the reset indication D is included in the control signal SIG5 shown in FIG. 1.

Disposing an Exception Handler

Figure 2:
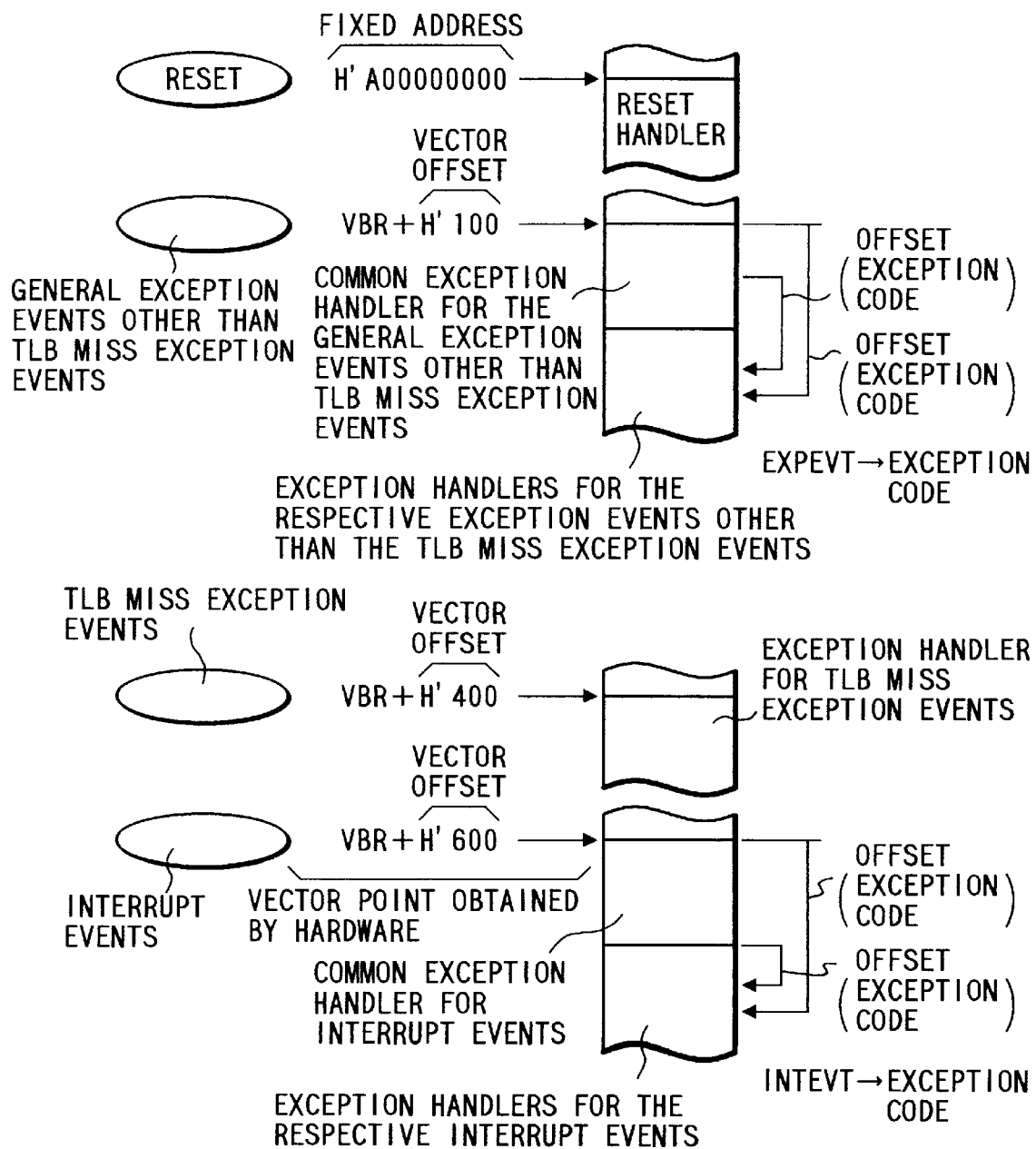
FIG. 2 is a diagram which schematically illustrates a vector point by hardware when an exception event is generated and the method of this embodiment for branching from a pointed handler to another handler.

The vector offset defined by H,100, H'400 and H'600 mentioned above, defines an offset which is fixed relying upon the values (base addresses of vector tables) of the vector base register VBR. Referring to FIG. 2, the exception handler related to the resetting is disposed on a fixed address of H'A00000000. The exception handler related to a TLB miss exception event is directly disposed at an address of a value of the register VBR+vector offset (H'400). As for the exception handlers related to other general exception events and interrupt events, a first handler (common to general exception events and interrupt events shown in FIG. 2) is disposed at an address position obtained by adding the vector offset of H,100 or H,600 to the value of the register VBR. Branching from the first handler to a different second handler specific to the exception event is effected by using an exception code stored in the register EXPEVT OR INTEVT as an address offset.

How the exception code be utilized as an address offset is determined by the content of description (software program) of the handler (by the user description) disposed at a position of the vector base register VBR+vector offset. For instance, branching into a second handler may be defined as a VBR+vector offset+exception code, or an exception code may be added to the base address set in the handler to define branching into the second handler, or the exception code may be shifted by a predetermined number of bits to define branching into the second handler. In effect, the exception codes which are allocated maintaining a predetermined gap such as H'20, should be utilized as desired depending upon the amount of description of the handler, etc. When the exception code stored in the register EXPEVT or INTEVT is utilized as an address offset, the CPU feeds an address signal of the register EXPEVT or INTEVT to the address bus of the system bus S-bus, and feeds a read control signal to the control bus of the system bus S-bus to access the register EXPEVT or INTEVT. The read-accessed register EXPEVT or INTEVT feeds the exception code stored therein to the data bus of the system bus, and the CPU stores the exception code in the general-purpose register (R0). Accordingly, the CPU makes it possible to calculate the exception code. In practice, the calculation is carried out by the ALU in the CPU.

Concerning the exception handlers for the general exception events other than the TLB miss exception events, a first handler common to the general exception events is disposed at a vector point of VBR+vector offset (H'100) as shown in FIG. 2. The first handler has a description defining the branching to a separate handler (second handler) by using the exception code corresponding to the exception event as an address offset. Therefore, branching into a desired second handler is accomplished by disposing the second handler specific to the exception event at the addresses that are obtained by adding exception codes to the vector point. In this case, the exception codes are obtained from the register EXPEVT.

The same holds even for the exception handlers related to the interrupt events; i.e., a first handler common to the interrupt event is disposed at a vector point of VBR+vector offset (H'600). The first handler has a description defining the branching to a further different handler (second handler) using the exception code corresponding to the interrupt event as an address offset. Therefore, branching to a desired second handler is accomplished by disposing the second handler specific to the interrupt event at the addresses obtained by adding exception codes to the vector point. In this case, the exception codes of interrupt events are obtained from the register INTEVT.

According to the present invention, the exception handlers are assigned to the address region P1 or P2 that does not require address translation utilizing TLB. Therefore, multiple occurrence of exception events related to the address translation is avoided, and the data are efficiently processed.

In the above-mentioned handler arrangement, if a TLB miss exception event, other general exception event or an interrupt event occurs, the processing of the central processing unit CPU is branched to an address position obtained by adding, as an offset address, a vector offset to a base address of the vector table set to the VBR, and the handler disposed at the address position is processed. The branching is defined by the hardware of the microcomputer MPU. In this case, which vector offset to be used is exclusively determined by the kind of exception occurrence factor as explained with reference to FIG. 14. When the exception event is different from the TLB miss exception events, the handler assigned to a vector point specified by VBR+vector offset (H'400) is regarded as a TLB miss exception handler. In the case of other general exception events or interrupt events, the handler of a vector point specified by VBR+vector offset, includes a branch processing using the exception code of the exception event as an offset, and a handler specific to the exception event is disposed at the destination.

As for the unconditional trap generated by executing the trap instruction, an immediate value of 8 bits possessed by the trap instruction is stored in the trap register TRA shown in FIG. 9 and is added to the address data of low order in the VBR register, so that the corresponding exception handler is fetched by a value obtained by the addition. The unconditional trap is utilized for calling an operating system from a task in the user program.

Flow of Exception Event Processing

Figure 10:
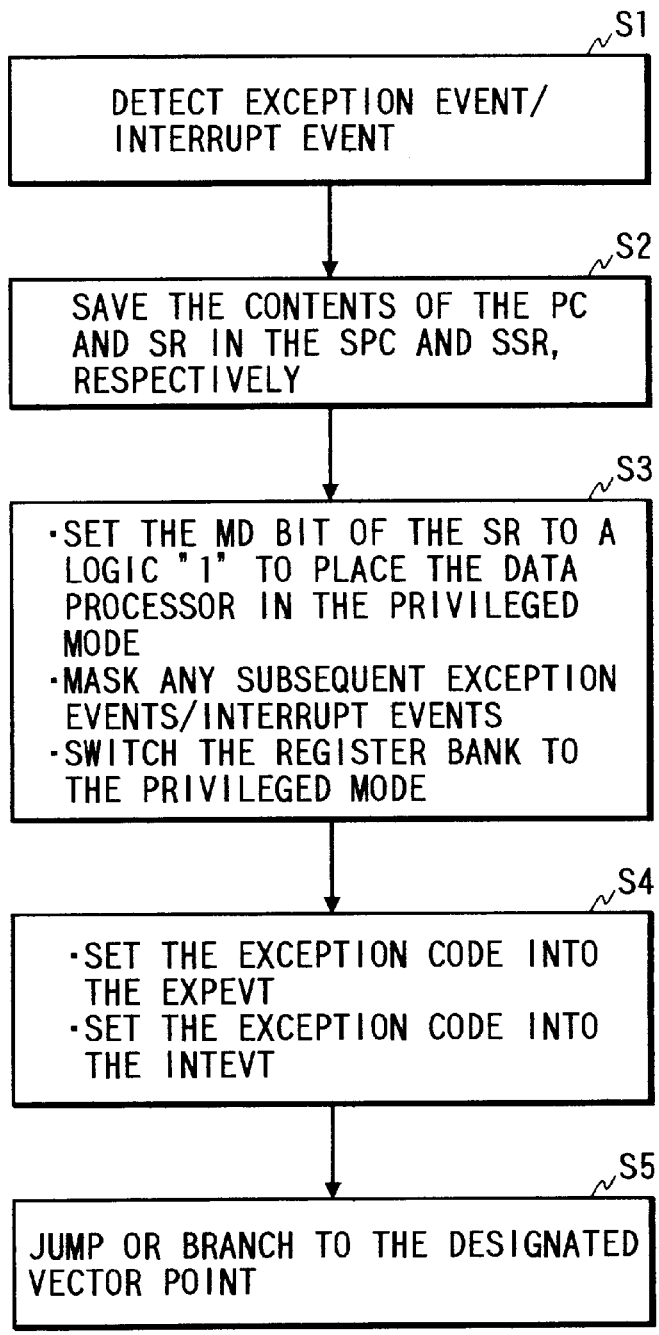
FIG. 10 is a flow chart illustrating a vector point processing determined by hardware.

FIG. 10 is a flow chart of a processing for branching to a vector point by the vector offset. As explained with reference to FIG. 14, the branching to the vector point is defined by hardware of the microcomputer MCU, positioned as a transition to a supervisor state, and includes steps that are described below.

Detect Exception Event/Interrupt Event

A reset event, general exception event or interrupt event is detected by the control unit CTRL (S1). The control unit CTRL detects ah exception event relying upon a reset signal generated by the manipulation of a reset switch when the exception event is a manual reset, detects an exception event relying upon a detection signal of TLB miss exception event output from the control circuit TLBC of memory management unit MMU when the exception event is a TLB miss exception event, or detects an exception event relying upon an interrupt signal SIG1 fed to the central processing unit CPU from the interrupt controller INTC when the exception event is an interrupt event. Exception events in the central processing unit CPU is detected based upon the internal conditions thereof.

Saving PC and SR

Next, the central processing unit CPU saves the value of the program counter PC in the saved program counter SPC and saves the value of the status register SR in the saved status register SSR (S2). In the case of general exception events, the timing of saving is at a moment it occurs. Therefore, addresses of uncompleted instructions are saved. After returned, the instructions are retried. When an interrupt event occurs, the above-mentioned two values are saved after the completion of the execution of an instruction being executed by the central processing unit CPU and, as a result, the address of an instruction next of the above instruction is saved. Accordingly, no memory access is required for saving the value of the program counter PC and the value of the status register SR in the stacked regions of the memory when an exception event occurs, but the registers need simply be accessed, enabling the saving processing of the microcomputer MCU to be executed at a high speed.

Change-over of processor mode

The central processing unit CPU sets the mode bit MD of the status register SR to logical value 1, and sets the operation mode of the microcomputer MPU to a supervisor mode (S3). The central processing unit CPU further sets the block bit BL of the status register SR to the logical value "1" and masks other exception and interrupt events (S3). The central processing unit CPU further sets a register bank bit RB of the status register SR to the logical value "1", and changes the general-purpose registers R0 to R7 in the supervisor state over to register banks different from those of the user state (S3). Since the banks of the general-purpose registers R0 to R7 are changed over, the general-purpose registers R0 to R7 of register banks in the user state need not be saved.

Setting the exception events

Next, the exception code assigned to the exception event or the interrupt event is set to the register EXPEVT or INTEVT as explained with reference to FIG. 15 (S4). To the former register EXPEVT is set a general exception code or a reset exception code, and to the latter register INTEVT is set an interrupt code by the logic circuit LOG in the MMU.

Branching to a vector point

As described above, the control operation in the central processing unit CPU is branched to a predetermined vector point (S5). When the exception processing is that of the reset event, the control operation is branched to the fixed address H'A0000000. In the case of general exception events and interrupt events, the control operation of the central processing unit CPU is branched to an address obtained by adding a predetermined vector offset to the base address of the vector table in the register VBR. A predetermined handler is placed on the branched vector point as shown in FIG. 2. In the case of the reset event, an exception handler for the reset event is disposed and in the case of TLB miss exception events, a TLB miss exception handler for renewing the TLB entry is disposed (see FIG. 2). In the case of general exception events other than TLB miss exception events or in the case of interrupt events, a handler (common to general exception events and interrupt requests shown in FIG. 2) is disposed including a processing for branching to a different handler specific to the exception event.

When the TLB miss exception occurs while the instruction is being executed, a physical page address corresponding to a logical page address related to a TLB miss exception event must be read out from the page table on the external memory MMRY in order to update the address translation look-aside buffer TLB and to effect the translation into a physical address. Accordingly, the transition time from the occurrence of the TLB miss exception event to the countermeasure processing therefor greatly affects the instruction execution speed or the data processing speed of the central processing unit. With the TLB miss exception handler which is considered to most seriously affect the data processing performance being directly disposed on the vector point, therefore, it is allowed to greatly shorten the processing time of branching the control operation of the central processing unit CPU to the exception handler. It is therefore allowed to increase the data processing speed of the microcomputer MPU.

Figure 11:
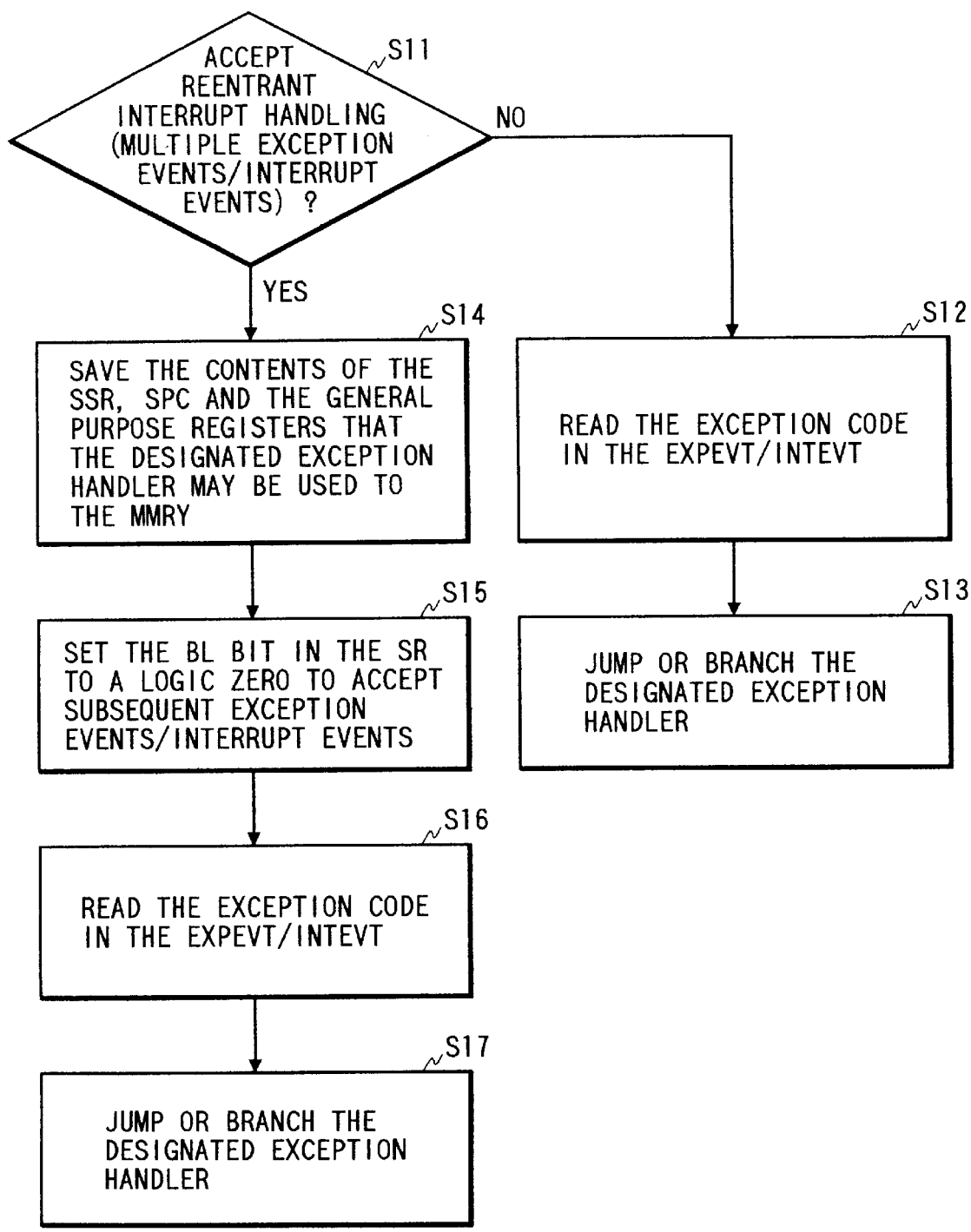
FIG. 11 is a flow chart illustrating a handler processing placed on a vector point.

FIG. 11 illustrates a flow of processing of an exception handler (excluding reset handlers and TLB miss exception handlers) placed on the vector point. This processing is solely specified by software and includes the steps that are described below.

First, it is determined whether to accept succeeding exception events and interrupt events in a multiplexed manner (S11). The determination complies with the description of the handler.

When the interrupt events are not accepted in a multiplexed manner, the exception code is read from the registers EXPEVT, INTEVT (S12), and the processing is effected for branching into a corresponding exception handler by using the exception code as an address offset (S13). The central processing unit CPU calculates VBR+vector offset+ exception code, and the processing is shifted to the exception handler assigned to the address that is calculated, i.e., shifted to the exception handler at the destination. Thus, the central processing unit CPU copes with the exception event that has occurred.

When interrupt events are accepted in a multiplexed manner, the central processing unit CPU saves the data of registers such as save status register SSR, save program counter SPC, etc. used by the handlers of FIG. 10 in the external memory MMRY in order to guarantee the flow of processing described with reference to FIG. 10 (S14). The central processing unit CPU sets the block bit BL of the status register SR to the logic value "0" and removes the masking against the other exception and interrupt events (S15). Thereafter, the central processing unit CPU reads the exception code from the registers EXPEVT, INTEVT in the same manner as described above (S16), and is branched to the corresponding exception handler with the exception code as an address offset (S17). That is, the central processing unit CPU calculates VBR+vector offset+exception code, and executes the exception handler assigned to the address that is calculated, i.e., executes the exception handler at the destination.

As obvious from the flow charts of FIGS. 10 and 11, for the processing for the TLB miss exception events for which the high-speed operation is the first priority, the value of the register VBR is read one time and a vector offset (M'400) is simply added thereto in order to obtain a vector point of the TLB miss exception handler. As for other exception events, the control operation is branched to a predetermined exception handler by using, as an address offset, an exception code obtained by reading the value of the register EXPEVT or INTEVT one time in addition to obtaining a vector point obtained by adding a vector offset to the value of the register VBR. This branching, too, makes it possible to quickly shift the processing to a processing for the exception events without the need of directly accessing the address at the destination. As obvious from FIG. 11, whether to accept the exception and interrupt events in a multiplexed manner is determined by the description of the handler assigned to the address of the vector point specified by hardware. When the exception events are to be accepted in a multiplexed manner, the values stored in the saved registers SSR, SPC are saved in the external memory MMRY. When the high-speed operation is required such as in the processing of TLB miss exception events, the TLB miss exception handler is executed while masking the multiple exception events or the multiple interrupt events. Therefore, the values of the saved status register SSR and the saved program counter SPC need not be saved at all. In this respect, it is guaranteed to minimize the transition time from the occurrence of a TLB miss exception event to the execution of a TLB miss exception handler.

Figure 12:
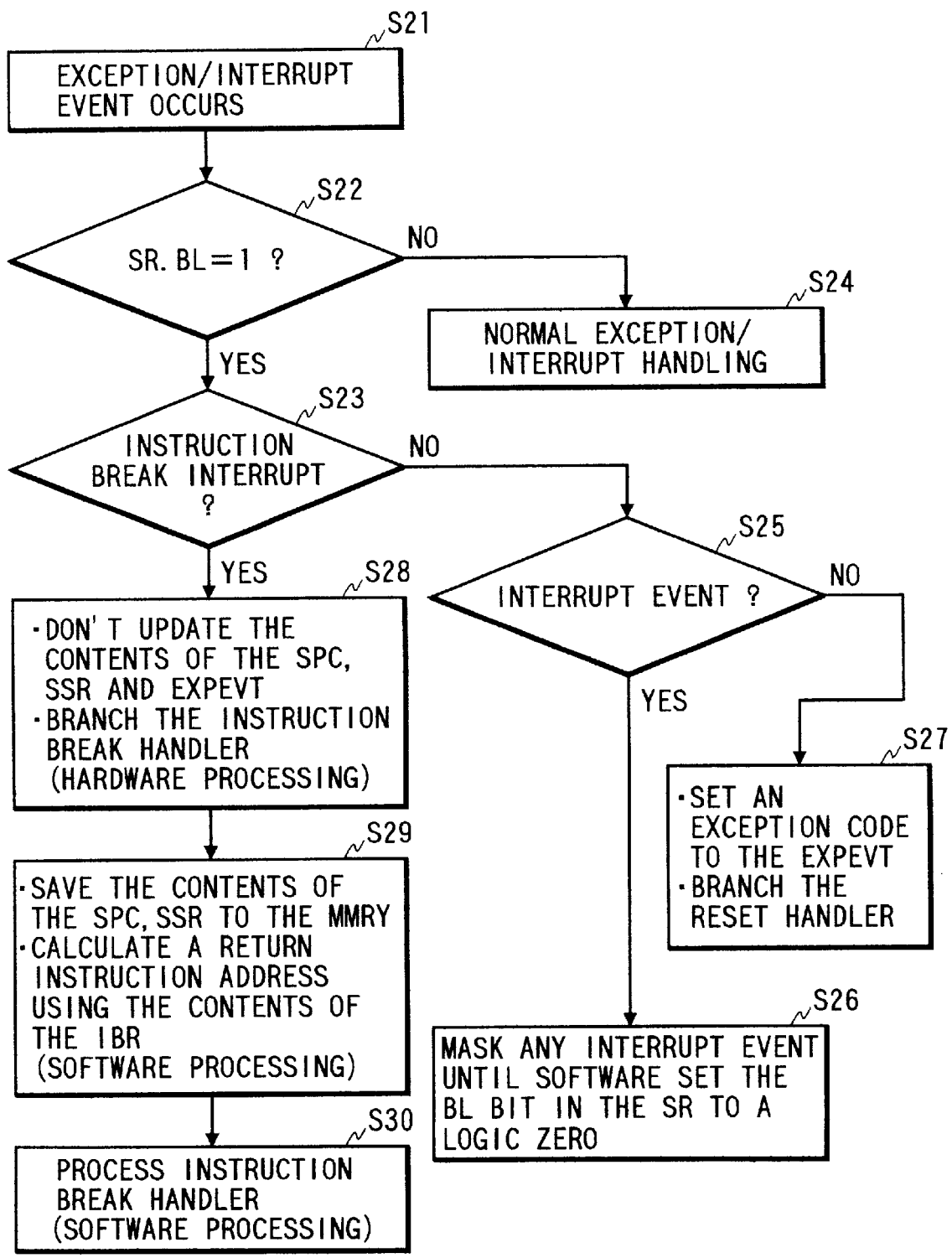
FIG. 12 is a flow chart of a processing of when another interrupt event or a general exception event has occurred during the processing of an interrupt event or a general exception handler.

FIG. 12 illustrates a flow of processing of when exception and interrupt events have newly occurred at the destination after the operation has branched to the exception processing for treating general exception events and interrupt events.

When a new exception event or interrupt event occurs (S21), it is determined whether to accept the exception event or the interrupt event depending upon whether the block bit BL of the status register SR has the logic value "1" or not (S22) and depending upon whether the new exception event or the interrupt event is an instruction break exception or not (S23). When the multiple acceptance is permitted due to SR, BL=0, the processing is executed according to the flows of FIGS. 10 and 11 (S24).

When multiple acceptance of exception events is inhibited by SR.BL=1 (YES in S22) and when the general exception event occurring at that time is not an instruction break exception event (NO in S23) but is an interrupt event (YES in S25), the acceptance of interrupt event is suppressed (S26) until the software sets SR.BL=0 (e.g., until the program proceeds to the step S15 after having finished the processing of the step S14). When it is the general exception event or the reset event (NO at S25), the exception code is set to the register EXPEVT and, then, the processing is automatically branched to a reset handler (S27).

When the exception event is an instruction break exception event, the registers SPC, SSR and EXPEVT are not updated in the hardware processing of FIG. 10, the processing of the central processing unit CPU is branched to an instruction break handler, and the registers SPC, SSR are saved in the memory by the handler processing. Then, a return address is calculated from the break point address of the break register IBR, and is set to the saved program counter SPC. The instruction break exception handler is then processed to cope with the instruction break exception event. The return from the instruction break exception handler is accomplished by utilizing the return address saved in the register SPC, and a program to be debugged is continuously executed starting from next of the instruction break point. For the instruction break exception events as described above, the system can be evaluated and the program can be debugged by applying an instruction break at any position even for a program that is to be debugged in a state of masking the acceptance of exception events occurring in a multiple manner.

The above-mentioned embodiment exhibits actions and effects that are described below.

(1) For the TLB miss exception events for which the high-speed operation is the utmost priority, the value of the register VBR is read once and a vector offset (H'400) is simply added thereto to obtain a vector point (address of the destination) of the TLB miss exception handler. For the other exception events, furthermore, a head address (address of the destination) of a desired exception handler is Obtained by adding, as an address offset, the exception code that is obtained by reading once the value of the register EXPEVT or INTEVT to a vector point that is obtained by adding the vector offset to the value of the register VBR.

Thus, the address at the destination is obtained without accessing the external memory, and a transition time is shortened from the occurrence of an exception event to the handler processing to cope with the exception event. This enables the microcomputer MPU to carry out the data processing at an increased speed as a whole. In other words, for the processing of TLB miss exception events which is desired to be executed at high speeds, utmost priority is given to shortening the time for transition to the exception event processing. For the interrupt events for which shortening the time for transition to the exception event processing does not contribute to increasing the speed of the TLB miss exception event processing, on the other hand, versatility is imparted to mapping the handlers or to the handler sizes, so that the user finds it easy to use the processor.

(2) Only some exception handlers (TLB miss exception handlers) among the exception handlers disposed at an address obtained by adding the value of the vector bus register and the vector offset together, directly execute exception processing for the corresponding exception events. For the other exception events, the exception code is utilized as an address offset, and the processing is branched so as to arrive at a desired handler. In other words, the number of vector offsets is very smaller than the number of exception events.

When specific fixed offsets (vector offsets) are utilized for all exception events, the amount of hardware for forming vector offsets increases with an increase in the exception events. Accordingly, the area of the semiconductor chip forming the microcomputer increases and the cost of the microcomputer itself is driven up, too.

According to the exception event processing as contemplated by the present invention, however, it is allowed to accomplish both the reduction in the physical scale of the circuit and an increase in the data processing speed. According to the present invention, therefore, the microcomputer MPU can be formed in a semiconductor chip having a small area at a reduced cost.

(3) Whether the multiple acceptance of exception events and interrupt events be permitted or not is determined by the description of the vector point handler specified by hardware. When the multiple acceptance of exception events is permitted, the values that have been already saved in the saved registers SSR and SPC are further saved in the external memory MMRY. When the high-speed processing is required such as for the TLB miss exception events, the exception handler is executed in a state of masking the multiple exception events or multiple interrupt events. Accordingly, the values of the saved status register SSR and the saved program counter SPC need not at all be saved in the external memory MMRY. In this respect, it is guaranteed to minimize the transition time from the occurrence of a TLB miss exception event to a TLB miss exception handler.

(4) When the processing is branched from a vector point handler determined by hardware to a different handler, the exception code is utilized as an address offset for branching. In other words, the exception codes are assigned maintaining a space of, for example, H'20 so as to be corresponded to 32 bytes reckoned as address, so that the individual exception codes can be utilized as address offsets. Therefore, a base address for the exception codes (address offset) is freely determined according to the description of program of an exception handler that is disposed at a vector point determined by hardware. This guarantees the freedom for the user for the practical address at a destination and for the handler size at the destination.

(5) Employment of the registers SSR, SPC for saving the internal conditions and return instruction addresses makes it possible to decrease access to the external memory during the saving when an exception event has occurred.

(6) In order to cope with both the general exception events that occur in synchronism with the operation of the central processing unit CPU and the interrupt events that occur out of synchronism therewith, provision is made of the register EXPEVT for storing exception codes related to general exception events and the register INTEVT for storing exception codes related to interrupt events. Cumbersome processing is not, therefore, needed for writing exception codes into a common register at similar timings for the occurrence of both exception events, and the exception codes can be set to the registers through a simple processing.

(7) In the processing of a reset exception handler or a TLB miss exception handler (handler at a destination determined by hardware depending upon the exception event), the initial processor mode is set to be constant as it is shifted to the state of masking multiple acceptance of exception events or to the supervisor state. Therefore, a high degree of freedom is guaranteed for the content of exception processing specified on the handler of the user.

(8) Register banks of general-purpose registers R0 to R7 are changed over by software only in the supervisor state, and the central processing unit CPU is allowed to utilize general-purpose registers R0 to R7 of the banks different from those of the user state. This means that when the processor mode is changed from the user state over to the supervisor state in the exception event processing, the contents of the general-purpose registers R0 to R7 need not be saved into the external memory MMRY. Even in this respect, the transition time is shortened from the occurrence of an exception event to the corresponding processing.

(9) In processing an exception handler in the state of masking multiple exception events, an instruction break exception event is processed making it possible to evaluate the system or to debug the program by applying an instruction break at any position even for a program that is to be debugged in a state where the multiple acceptance of exception events is masked.

(10) The address regions P1, P2 are the regions where the corresponding physical addresses are fixed but in which the addresses are not translated by using the address translation look-aside buffer TLB. When the address regions P1 and P2 are to be accessed in the supervisor state, there occur in a multiple manner neither TLB miss exception events nor exception events related to address translation. With the handlers of interrupt events and general exception events being disposed in the address region P1 or P2, therefore, there newly develop neither TLB miss exception events nor exception events related to address translation during the exception event processing. In other words, it is allowed to avoid a situation in which exception events related to address translation occur in a multiple manner, and the data processing is efficiently executed by the central processing unit CPU.

In the foregoing was concretely described an invention accomplished by the present inventors by way of an embodiment. It should, however, be noted that the present invention is in no way limited thereto only but can be modified in a variety of other ways without departing from the gist and scope of the invention.

For instance, vector offsets determined by hardware are not limited to H'100, H'400 and H'600, and exception codes specifying address offsets and gaps for assigning them are not limited to those of the above-mentioned embodiment only but can be suitably changed. Furthermore, the exception events are not limited to those of the idea by which they are roughly divided into reset event, general exception events and interrupt events of the above-mentioned embodiment. Moreover, though a TLB miss exception handler was directly disposed on a first vector point determined by hardware, the exception handler disposed on the vector point is in no way limited thereto only but can be suitably changed depending upon the system constitution. In another exception handler disposed on a second point branched from the first vector point, furthermore, it is apparent that the processing can be branched into another handler. Even in this case, the exception code can be utilized as address offset information.

In the foregoing was described the case where the invention accomplished by the present inventors was adapted to a microcomputer which creates the field of utilization of the invention. The invention, however, can be broadly adapted to a variety of data processors that support exception event processing irrespective of their names such as data processor, microprocessor, digital signal processor and the like names.

Briefly described below are the effects obtained by a representative example of the invention disclosed in this application.

That is, the memory need not be directly accessed to obtain an address at the destination even in the branching into a handler at a first vector point determined by hardware or in the branching into a different handler which uses the exception code from the above handler as an offset. This makes it possible to shorten the transition time from the occurrence of an exception event to a handler for coping with it and, hence, to execute the data processing by the microcomputer at a speed which is increased as a whole.

As for the TLB miss exception events which must be processed at a high speed, the exception event processing is carried out directly by an exception handler disposed at an address obtained by utilizing a vector offset which is a fixed offset. This contributes to shortening the transition time into a processing for the TLB miss exception events. For the interrupt events for which shortening the transition time into the exception event processing does not so much contribute to increasing the data processing speed as the processing of TLB miss exception events, versatility is given to mapping the handlers and to the handler sizes, so that the user finds the processor easy to use.

Among the exception handlers disposed at addresses obtained by adding the value of the vector base register and the vector offsets, only some handles (TLB miss exception handlers) directly execute exception event processing for the corresponding exception event. For other exception events, the exception codes are utilized as address offsets and the processing is branched so as to arrive at a desired handler. This, therefore, makes it possible to accomplish both a reduction in the physical scale of the circuit and an increase in the data processing speed.

On the handler of a vector point specified by hardware, it is determined whether to permit multiple acceptance of new exception events. When the multiple acceptance is permitted, the contents in the saved registers are stored in the memory, so that the state and return address are necessarily stored in the saved register when an exception event occurs. Even in this respect, the transition time is shorted from the occurrence of an exception event to a handler for coping with it.

When the processing is branched from a vector point handler determined by hardware to a different handler, the exception code is utilized as an address offset for branching. Therefore, a base address for the offset is freely determined according to the description of a handler of a vector point determined by hardware. This guarantees freedom for the address at a destination and for the handler size at the destination.

Employment of the registers for saving the internal conditions and return instruction addresses makes it possible to decrease access to the memory during the saving when an exception event occurs.

In dealing with both the first exception events that occur in synchronism with the operation of the central processing unit and the second exception events that occur out of synchronism therewith, when the central processing unit is operated at a multiple of the operation clock frequency of the peripheral modules which are sources of generating interrupt events, the registers are provided for storing the exception codes separately for the first exception events and for the second exception events. Therefore, cumbersome processing is not needed for writing exception codes into a common register at similar timings for the occurrence of both exception events, and the exception codes can be set to the registers through a simple processing.

An initial processor mode on the handler at a destination determined by hardware depending upon an exception event, is set to be constant in a state of masking multiple acceptance of exception events and in a supervisor state. Therefore, a high degree of freedom is guaranteed for the content of exception processing specified by the user on the handler.

Register banks of general-purpose registers are changed over by software only in the supervisor state, and it is allowed to utilize general-purpose registers of the banks different from those of the user state. Therefore, when the processor mode is changed from the user state over to the supervisor state in the exception event processing, the contents of the general-purpose registers need not be saved into the memory. Even in this respect, the transition time is shortened from the occurrence of an exception event to the corresponding processing.

An instruction break exception event is processed in the exception handler in a state of masking exception events, making it possible to evaluate the system or to debug the program by applying an instruction break at any position even for a program that is to be debugged in a state where the multiple acceptance of exception events is masked.

What is claimed is:

1. A single-chip data processor comprising:

a central processing unit; and a storage circuit, adapted for storing an exception code in response to an exception event, wherein the exception code corresponds to the exception event, comprising:

a first portion adapted for storing the exception code corresponding to a first type of exception event that occurs synchronously with the operation of the central processing unit; and a second portion adapted for storing the exception code corresponding to a second type of exception event that occurs asynchronously with the operation of the central processing unit; and wherein the central processing unit includes:

a program counter;

a plurality of general purpose registers;

a base register storing a vector base address, the vector base address representing a start address of a vector table corresponding to a plurality of exception handlers, wherein the vector base address is changeable in response to a program executed by the central processing unit, and a control unit which, in response to the occurrence of an exception event, writes a first instruction address into the program counter based on the vector base address and a predetermined vector offset, wherein the predetermined vector offset is assigned in advance to the exception event and provided in response to the exception event so that a first exception handler assigned to the first instruction address may be executed, wherein the central processing unit calculates a second instruction address of a second exception handler from the first exception handler by utilizing the exception code stored in the storage circuit as an address offset without the calculation effecting the plurality of general purpose registers.

2. A single-chip data processor according to claim 1, wherein the central processing unit further comprises:

a status register for storing internal conditions of the data processor;

a first saved register into which, in response to the occurrence of an exception event, the internal conditions are stored in the status register and a second saved register into which, in response to the occurrence of the exception event, a return instruction address is stored, wherein the return instruction address corresponds to an instruction that is to be executed after completion of processing of the exception event.

3. A single-chip data processor according to claim 2, wherein the central processing unit further comprises:

an arithmetic and logic operation unit, and a constant generating unit which generates the predetermined vector offset in response to the occurrence of the exception event, wherein the arithmetic and logic operation unit adds the vector base address and the predetermined vector offset to generate the first instruction address under control of the control unit.

4. A data processor according to claim 3, wherein the status register includes:

a first control bit that stores operating state data representing whether the single-chip data processor is in a user state in which a user program is running or in a supervisor state in which a system program is running; and a second control bit that stores mask data representing whether to accept or mask other exception events that follow the exception event, wherein the control unit saves the internal conditions and the return instruction address in the first saved register and in the second saved register, respectively, and sets to the first control bit the operating state data representing the supervisor state and to the second control bit the mask data representing that the other exception events that follow the exception event are to be masked, wherein operation of the central processing unit branches to the first exception handler assigned to the first instruction address.

5. A single-chip data processor according to claim 4,
wherein the control unit sets mask data to the second control bit according to a processing specified in the first exception handler and saves the contents of the first and the second saved registers in a memory when the data set to the second control bit is mask data representing the acceptance of other exception events that follow the exception event.

6. A single-chip data processor according to claim 1, wherein the central processing unit includes:
  a first saved register;
  a second saved register;
  a status register including a first control bit and a second control bit;
 an instruction break address register storing an instruction address specifying a break point; and
 an instruction break controller which generates an instruction break exception event when an instruction corresponding to the instruction address stored in the instruction break address register is executed by the central processing unit,
 wherein when the instruction break exception event is detected in a state where the mask data stored in the second control bit represents masking other exception events that follow the exception event, the control unit controls a branch to an instruction break exception handler without saving the internal conditions and the return instruction address in the first and the second saved registers, and
 wherein the instruction break exception handler calculates a return instruction address from the instruction break exception handler by utilizing an instruction address stored in the instruction break address register after the internal conditions and the return instruction address are saved in the memory, and writes the calculated return instruction address into the second saved register, wherein the instruction break exception event is processed with the instruction break exception handler in a state where multiple exception events are masked.

7. A single-chip data processor according to claim 6,
wherein when a third exception event other than the instruction break exception event is detected in a state where the mask data stored in the second control bit represents masking other exception events that follow the exception event, the control unit controls a branch to a handler of reset exception after the exception code is stored in the storage circuit, and, when a fourth exception event is detected, masks acceptance of the fourth exception event until the masking for the multiple acceptance of the exception events is reset.

8. A single-chip data processor according to claim 4,
wherein the central processing unit further comprises:
 first and second general-purpose register sets constituting a plurality of banks, wherein one of the first and second general-purpose register sets is used as a general-purpose register set in the supervisor state and the other of the first and second general-purpose register sets is used as a general-purpose register set in the user state.

9. A single-chip data processor comprising:
 a central processing unit;
 an exception register for storing an exception code in response to occurrence of an exception event, the exception code corresponding to the exception event that has occurred, wherein the exception event is a predetermined type of exception event, the exception register having a first portion corresponding to a first predetermined type of exception event that occurs synchronously with the operation of the central processing unit and having a second portion corresponding to a second type of exception event that occurs asynchronously with the operation of the central processing unit; and
 the central processing unit including:
  a program counter;
  a plurality of general purpose registers;
  a vector base address register storing a vector base address, wherein the vector base address is changeable in response to a program executed by the central processing unit;
  a circuit responsive to an exception event and forming a vector offset from a number of vector offsets depending upon the type of the exception event, wherein the number of vector offsets is smaller than the number of exception events and wherein the vector offsets are fixed offsets to the vector base address for calculating vector addresses; and
  an arithmetic and logic unit for adding the vector base address and the vector offset and storing a calculated value in the program counter so that processing of the single-chip data processor branches to a first exception handler specified by the calculated value,
  wherein the central processing unit calculates a first instruction address of a second exception handler from the first exception handler utilizing the exception code stored in the exception register as an address offset without the calculation effecting the plurality of general purpose registers.

10. A single-chip data processor according to claim 9, further comprising:
 a memory management unit having an address translation look-aside buffer,
 wherein the vector offset comprises a first vector offset assigned to a plurality of interrupt events, wherein a second vector offset is assigned to address translation look-aside buffer miss exception events, and wherein a third vector offset is assigned to general exception events other than the address translation look-aside buffer miss exception events.

11. A single-chip data processor according to claim 10, wherein the exception register is provided in the memory management unit.

12. A single-chip data processor comprising:
 a central processing unit;
 an address translation look-aside buffer controller including:
  a storage circuit, adapted for storing an exception code in response to an exception event, wherein the exception code corresponds to the exception event, comprising:
   a first portion adapted for storing the exception code corresponding to a first type of exception event that occurs synchronously with the operation of the central processing unit; and
   a second portion adapted for storing the exception code corresponding to a second type of exception event that occurs asynchronously with the operation of the central processing unit; and
 the central processing unit including:
  a program counter;

a plurality of general purpose registers;

a base register storing a vector base address, the vector base address representing a start address of a vector table corresponding to a plurality of exception handlers, wherein the vector base address is changeable in response to a program executed by the central processing unit, and a control unit which, in response to the occurrence of an exception event, writes a first instruction address into the program counter based on the vector base address and a predetermined vector offset, wherein the predetermined vector offset is assigned in advance to the exception event and provided in response to the exception event so that a first exception handler assigned to the first instruction address may be executed, wherein the storage circuit holds the exception code so that the central processing unit can calculate a second instruction address of a second exception handler from the first exception handler by utilizing the exception code as an address offset without the calculation effecting the plurality of general purpose registers.

13. A single-chip data processor comprising:

a central processing unit;

an exception register storing an exception code in response to occurrence of an exception event, the exception code corresponding to the exception event that has occurred, the exception register having a first portion corresponding to a first predetermined type of exception event that occurs synchronously with the operation of the central processing unit and having a second portion corresponding to a second type of exception event that occurs asynchronously with the operation of the central processing unit; and the central processing unit including:

a program counter;

a plurality of general purpose registers;

a vector base address register storing a vector base address, wherein the vector base address is changeable in response to a program executed by the central processing unit;

a circuit responsive to an exception event and determining a vector offset depending upon the type of the exception event;

an arithmetic and logic unit, wherein the arithmetic and logic unit calculates a first address of a first exception handler based on the vector base address and the vector offset, wherein processing of the single-chip data processor branches to the first exception handler;

wherein the central processing unit calculates a first instruction address of a second exception handler from the first exception handler utilizing the exception code stored in the exception register as an address offset without the calculation effecting the plurality of general purpose registers.

14. A single-chip data processor according to claim 13, further comprising:

a memory management unit having an address translation look-aside buffer, wherein the vector offset comprises a first vector offset assigned to a plurality of interrupt events, wherein a second vector offset is assigned to address translation look-aside buffer miss exception events, and wherein a third vector offset is assigned to general exception events other than the address translation look-aside buffer miss exception events.

15. A single-chip data processor according to claim 13, wherein the exception register is provided in a memory management unit coupled to the central processing unit.

* * * * *